United States Patent
Kobayashi et al.

(10) Patent No.: US 7,054,797 B2
(45) Date of Patent: *May 30, 2006

(54) APPARATUS FOR ENVIRONMENTAL IMPACT ESTIMATION AND METHOD AND PROGRAM STORED IN A COMPUTER READABLE MEDIUM FOR EXECUTING THE SAME

(75) Inventors: Hideki Kobayashi, Yokohama (JP); Akinori Hongu, Fujisawa (JP); Norio Takeyama, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 750 days.

This patent is subject to a terminal disclaimer.

(21) Appl. No.: 09/893,874

(22) Filed: Jun. 29, 2001

(65) Prior Publication Data
US 2002/0002408 A1    Jan. 3, 2002

(30) Foreign Application Priority Data
Jun. 30, 2000    (JP)    ............................. 2000-197803

(51) Int. Cl.
*G06F 7/48* (2006.01)
*G06F 17/10* (2006.01)
*G06F 17/16* (2006.01)
*G06F 19/00* (2006.01)

(52) U.S. Cl. ...................... 703/2; 703/7; 705/7; 700/97
(58) Field of Classification Search .................... 703/2, 703/7; 705/7; 700/97
See application file for complete search history.

(56) References Cited

U.S. PATENT DOCUMENTS 5,852,560 A * 12/1998 Takeyama et al. ............ 700/97
6,811,344 B1 * 11/2004 Kobayashi et al. ............ 403/2
2001/0029461 A1 * 10/2001 Kobayashi .................... 705/8
2002/0002408 A1    1/2002 Kobayashi et al.

FOREIGN PATENT DOCUMENTS

| JP | 63-144937 | 6/1988 |
| JP | 5-314094 | 11/1993 |
| JP | 7-311760 | 11/1995 |
| JP | 11-3101 | 1/1999 |
| JP | 11025064 | * 9/1999 |
| JP | 11-267951 | 10/1999 |
| JP | 11-288427 | 10/1999 |

(Continued)

OTHER PUBLICATIONS

Zhou, Mengchu et al., "Evaluation of Environmentally Conscious Product Designs". 1998 IEEE Int'l Conf. on Systems, Man, and Cybernetics. Oct. 1998. vol. 4, pp. 4057-4061.*

(Continued)

*Primary Examiner*—Paul L. Rodriguez
*Assistant Examiner*—Ayal Sharon
(74) *Attorney, Agent, or Firm*—Oblon, Spivak, McClelland, Maier & Neustadt, P.C.

(57) ABSTRACT

An apparatus comprising a storage device which stores information concerning first objects to be reused and second objects to be recycled, and a modeling device which performs life cycle modeling. The life cycle modeling includes reading information concerning the first objects and the second objects that configure a product from the storage device, selecting some of the first and second objects which are diverted to a new product from a recovery product using the information, and combining selected ones of the first and second objects to fabricate the new product to generate a life cycle model.

2 Claims, 30 Drawing Sheets

FOREIGN PATENT DOCUMENTS

WO     WO 01/59640 A2 * 8/2001

OTHER PUBLICATIONS

Anderi, R. et al. "Design for Environment—A Computer-Based Cooperative Method to Consider the Entire Life Cycle." Proc. EcoDesign '99: 1st Int'l Symposium on Environmentally Conscious Design and Inverse Manuf. Feb. 1999. pp. 380-385.*

Zhou, Mengchu et al., "A Cost Model for Multi-Lifecycle Engineering Design". IEEE Conf. on Emerging Technologies and Factory Automation (EFTA '96). Nov. 1996. vol. 1. pp. 385-391.*

Hoshino, T. et al. "Optimization Analysis for Recycle-Oriented Manufacturing Systems". Int. Journal Production Research. 1995. vol. 33, No. 8, pp. 2069-2078.*

Dalke, D. et al. "Product Environmental Impact Assessments". 1994 IEEE Int'l Symposium on Electronics and the Environment. May 1994. pp. 187-190.*

Luo, Yanchun et al. "Lifecycle Analysis for Environmentally Conscious Solid Freeform Manufacturing." Proc. of the 2000 IEEE Int'l Symposium on Electronics and the Environment. May 2000. pp. 33-38.*

Grenchus, E. "Composition and Value of Returned Consumer and Industrial Information Technology Equipment." Proc. of the 2000 IEEE Int'l Symposium on Electronics and the Environment. May 2000. pp. 324-329.*

Yan, Pingtao et al. "Multi-Lifecycle Product and Process Development: Selection of Optimal Production, Usage, and Recovery Processes." Proc. of the 1999 Int'l Symposium on Electronics and the Environment. May 1999. pp. 274-279.*

Limaye, K. et al. "System Simulation and Modeling of Electronics Demanufacturing Facilities." Proc. 1999 Int'l Symposium on Electronics and the Environment. May 1999. pp. 238-243.*

Thomas, V. et al. "Information Technology and Product Lifecycle." Proc. 1999 IEEE Int'l Symposium on Electronics and the Environment. May 1999. pp. 54-57.*

European Patent Office Int'l Search Report for Related U.S. Appl. No. 10/323,792 and European Application EP 02 25 8945.*

U.S. Appl. No. 09/893,874, filed Jun. 29, 2001, Kobayashi et al.

U.S. Appl. No. 10/323,792, filed Dec. 20, 2002, Kobayashi et al.

U.S. Appl. No. 11/082,101, filed Mar. 17, 2005, Kumazawa et al.

Tomioka et al., "IT Utilization Strategy for Each Product and Attracted Company: Aim at Adoption to Lifetime Reduction, Cost Reduction and Parts Recycle," Nikkei Digital Engineering, Japan, Nikkei Business Publications, Inc., Jan. 15, 2000, No. 26, pp. 104-111.

Watanabe et al., "Technique for Recycling Parts of Copying Machine," Nikkei Mechanical, Japan, Nikkei Business Publications Inc., Sep. 8, 1997, No. 514, pp. 22-23.

Kimura, "Inverse Manufacturing," IEEE Journal, Japan, The Institute of Electronics, Information and Communication Engineers, Aug. 25, 1997, vol. 80, No. 8, pp. 791-797.

6.6 Concept of Economical Lifetime, Economical Analysis, S. Senjyu et al., Japan, Japan Standards Organization, Dec. 10, 1996, Revised Edition, pages 122-124.

* cited by examiner

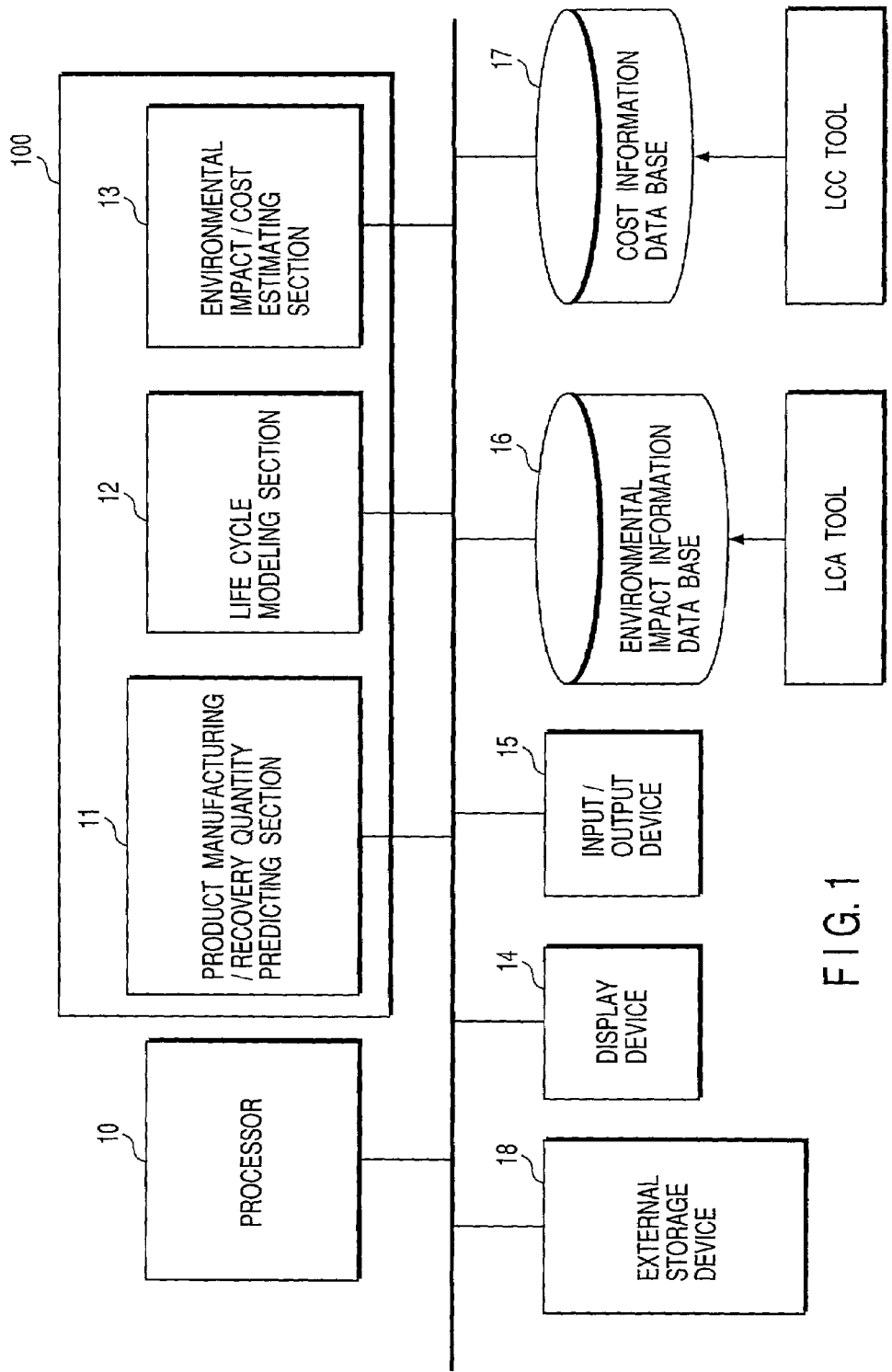
F I G. 1

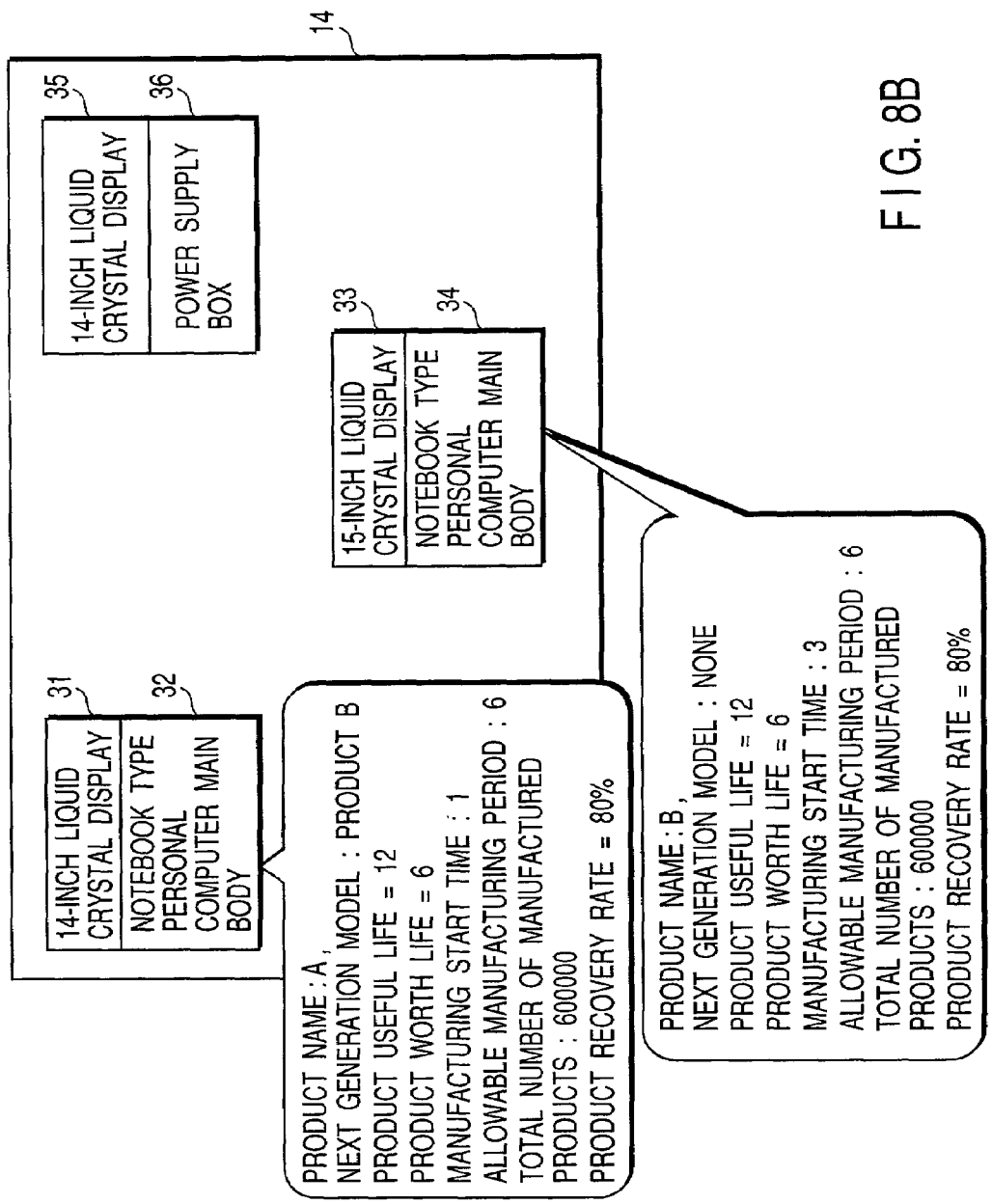

PRODUCT DATA

| PRODUCT NUMBER i | PRODUCT NAME | NEXT GENERATION MODEL NUMBER | USEFUL LIFE $la(i)$ | WORTH LIFE $lr(i)$ | MANUFACTURING START TIME | ALLOWABLE MANUFACTURING PERIOD | TOTAL NUMBER OF MANUFACTURED PRODUCTS $P(i)$ | PRODUCT RECOVERY RATE $C(i)$ |
|---|---|---|---|---|---|---|---|---|
| 1 | A | 2 | 12 | 6 | 1 | 6 | 600000 | 0.8 |
| 2 | B | – | 12 | 6 | 3 | 6 | 600000 | 0.8 |
| 3 | C | – | 10 | 6 | 1 | 6 | 900000 | 0.8 |

PART USE QUANTITY DATA

| | PART NUMBER m | | | |
|---|---|---|---|---|
| PRODUCT NUMBER i | 1 | 2 | 3 | 4 |
| 1 | 1 | 2 | 0 | 0 |
| 2 | 1 | 1 | 1 | 0 |
| 3 | 0 | 1 | 0 | 1 |

PART DATA

| PART NUMBER m | PART NAME | WEIGHT (g) | MATERIAL ACQUISITION $CO_2$ (g) | PART COST (YEN) | RECOVERY / INSPECTION $CO_2$ (g) | RECOVERY / INSPECTION COST (YEN) |
|---|---|---|---|---|---|---|
| 1 | 14-INCH LCD | 800 | 3500 | 20000 | 100 | 500 |
| 2 | NOTEBOOK TYPE PC MAIN BODY | 1200 | 65300 | 90000 | 160 | 800 |
| 3 | 15-INCH LCD | 900 | 3600 | 40000 | 100 | 500 |
| 4 | POWER SUPPLY BOX | 1000 | 21000 | 25000 | 80 | 400 |

{ THESE ITEMS OF DATA ARE SELECTIVELY READ FROM ENVIRONMENTAL IMPACT INFORMATION DATA BASE (DB) AND COST INFORMATION DATA BASE (DB) }

F I G. 12A

| PART NUMBER m | NUMBER j OF PARTS TARGETED PARTS |
|---|---|
| 1 | 1 |
| 2 | 2 |
| 3 | - |
| 4 | - |

| REUSE PART DATA | NUMBER j OF PARTS TARGETED FOR REUSE | REUSE SOURCE MANUFACTURING NUMBER i | REUSE DESTINATION MANUFACTURING NUMBER i |
|---|---|---|---|
| | 1 | 1 | 3 |
| | 2 | 1 | 2 |

| COMMON DATA | | |
|---|---|---|
| $CO_2$ PRODUCED PER PRODUCT MANUFACTURE (g) | 3200 | COST PER PRODUCT (YEN) 200 |
| $CO_2$ PRODUCED PER PRODUCT DISTRIBUTION (g) | 15 | COST PER PRODUCT (YEN) 2000 |
| $CO_2$ PRODUCED PER YEAR (g) | 850 | COST PER YEAR (YEN) 3000 |
| $CO_2$ PRODUCED PER UNIT WEIGHT RECOVERY (g) | 0.1 | COST PER UNIT WEIGHT 1 |
| $CO_2$ PRODUCED PER UNIT WEIGHT DISCARDING (g) | 0.8 | COST PER UNIT WEIGHT 0.5 |

THESE ITEMS OF DATA ARE SELECTIVELY READ FROM ENVIRONMENTAL IMPACT INFORMATION DATA BASE (DB) AND COST INFORMATION DATA BASE (DB)

F I G. 12B

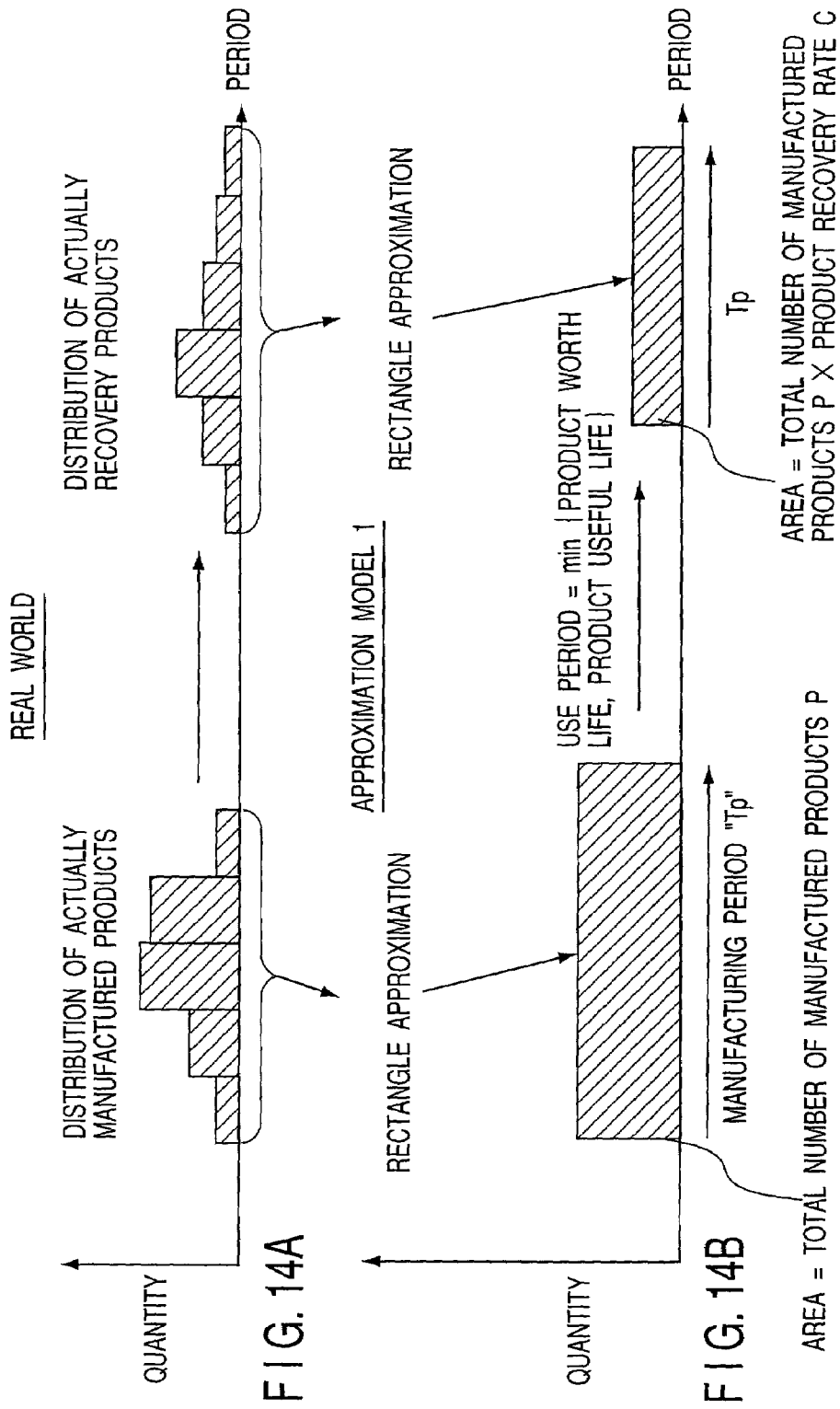

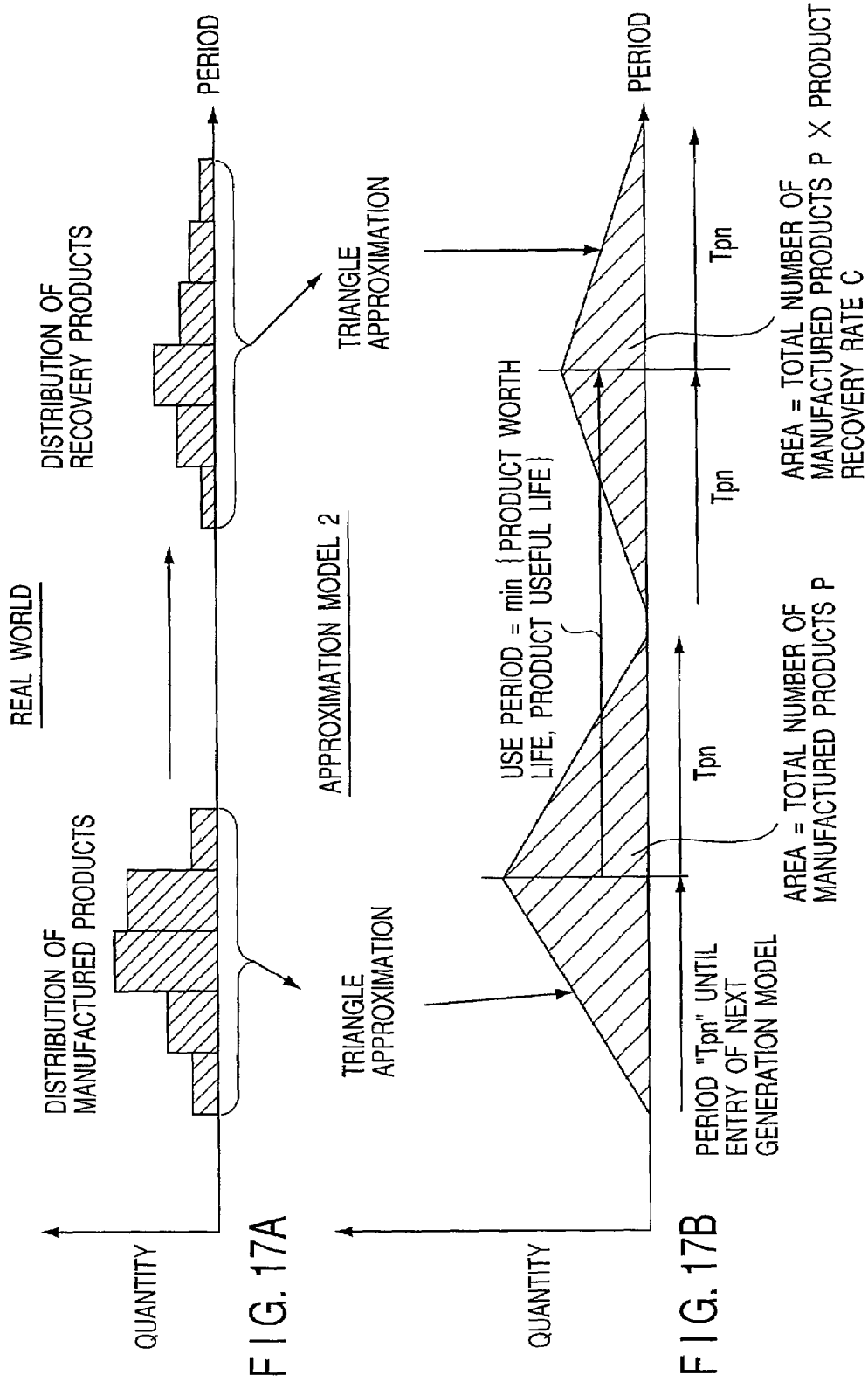

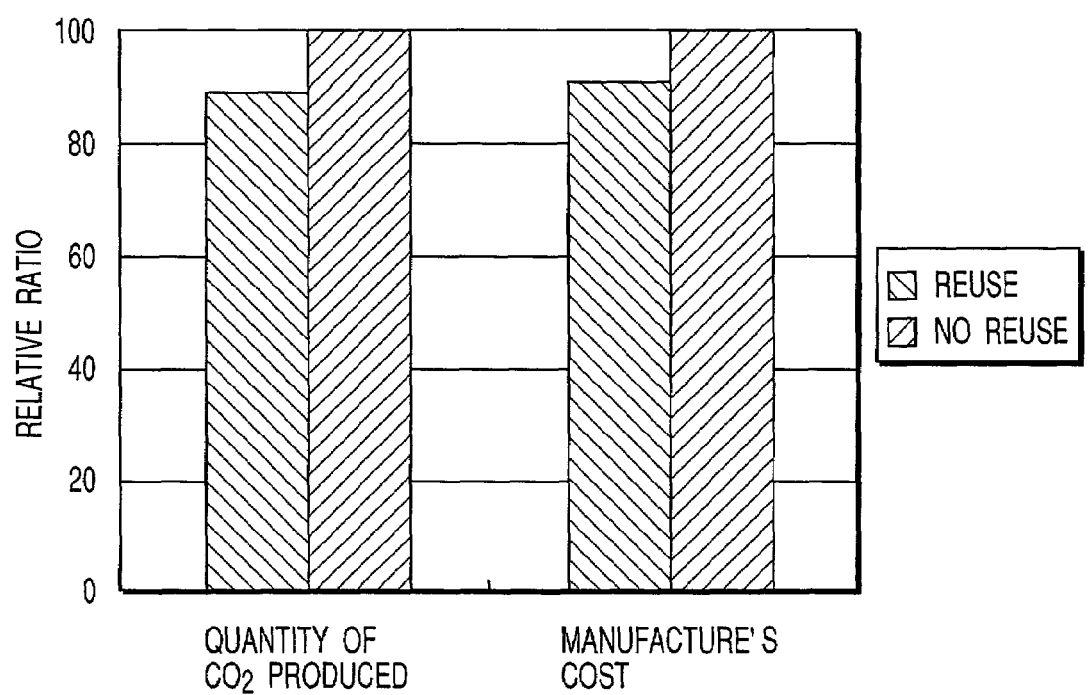
F I G. 20

PRODUCT DATA

| PRODUCT NUMBER i | PRODUCT NAME | NEXT GENERATION MODEL NUMBER |
|---|---|---|
| 1 | A | 2 |
| 2 | B | - |
| 3 | C | - |

PART USE QUANTITY DATA

| | | PART NUMBER m | | | |
|---|---|---|---|---|---|
| | | 1 | 2 | 3 | 4 |
| PRODUCT NUMBER i | 1 | 1 | 1 | 3 | 0 |
| | 2 | 0 | 1 | 0 | 0 |
| | 3 | 1 | 0 | 0 | 1 |

PART DATA

| PART NUMBER m | PART NAME | WEIGHT (g) | MATERIAL ACQUISITION $CO_2$ (g) | PART COST (YEN) | RECOVERY / INSPECTION $CO_2$ (g) | RECOVERY / INSPECTION COST (YEN) |
|---|---|---|---|---|---|---|
| 1 | 14-INCH LCD | 800 | 3500 | 20000 | 100 | 500 |
| 2 | NOTEBOOK TYPE PC MAIN BODY | 1200 | 65300 | 90000 | 160 | 800 |
| 3 | 15-INCH LCD | 900 | 3600 | 40000 | 100 | 500 |
| 4 | POWER SUPPLY BOX | 1000 | 21000 | 25000 | 80 | 400 |

THESE ITEMS OF DATA ARE SELECTIVELY READ FROM ENVIRONMENTAL IMPACT INFORMATION DATA BASE (DB) AND COST INFORMATION DATA BASE (DB)

FIG. 23A

| PART NUMBER m | NUMBER j OF PARTS TARGETED PARTS |
|---|---|
| 1 | 1 |
| 2 | 2 |
| 3 | - |
| 4 | - |

| | | NUMBER j OF PARTS TARGETED FOR REUSE | REUSE SOURCE MANUFACTURING NUMBER i | REUSE DESTINATION MANUFACTURING NUMBER i |
|---|---|---|---|---|
| REUSE PART DATA | | 1 | 1 | 3 |
| | | 2 | 1 | 2 |
| COMMON DATA | $CO_2$ PRODUCED PER PRODUCT MANUFACTURE (g) | 3200 | COST PER PRODUCT (YEN) | 200 |
| | $CO_2$ PRODUCED PER PRODUCT DISTRIBUTION (g) | 15 | COST PER PRODUCT (YEN) | 2000 |
| | $CO_2$ PRODUCED PER YEAR (g) | 850 | COST PER YEAR (YEN) | 3000 |
| | $CO_2$ PRODUCED PER UNIT WEIGHT RECOVERY (g) | 0.1 | COST PER UNIT WEIGHT | 1 |
| | $CO_2$ PRODUCED PER UNIT WEIGHT DISCARDING (g) | 0.8 | COST PER UNIT WEIGHT | 0.5 |

THESE ITEMS OF DATA ARE SELECTIVELY READ FROM ENVIRONMENTAL IMPACT INFORMATION DATA BASE (DB) AND COST INFORMATION DATA BASE (DB)

F I G. 23B

APPARATUS FOR ENVIRONMENTAL IMPACT ESTIMATION AND METHOD AND PROGRAM STORED IN A COMPUTER READABLE MEDIUM FOR EXECUTING THE SAME

CROSS-REFERENCE TO RELATED APPLICATIONS

This application is based upon and claims the benefit of priority from the prior Japanese Patent Application No. 2000-197803, filed Jun. 30, 2000, the entire contents of which are incorporated herein by reference.

BACKGROUND OF THE INVENTION

1. Field of the Invention

The present invention relates to an apparatus and method for aiding planning, development, design, and estimation of an environmentally conscious product. In particular, the present invention relates to a plan aiding apparatus and method for carrying out environmental impact estimation and cost estimation effective in planning multi-generation products.

2. Description of the Related Art

With the development of trade and industry, due to the greenhouse effect caused by increasing exhaust gases, there have been a variety of problems such as global warming, destruction of nature caused by the tremendous amount of waste and environmental pollution caused by toxic substances. Thus, it is important to reduce the environmental impact to earth of industrialized nations.

In considering the environmental impact of industry, it is insufficient to focus just on the manufacture of products and process up to the shipment of the manufactured article. Attention should also be paid to the discarding steps, including recycling.

It is required to plan environmental impact reduction from the viewpoint of a product life cycle from production to discarding. There has been increased importance placed on the technology for developing products so that the environmental impact of a product life cycle, from production to discarding of the products is reduced more reliably than conventional methods. It is anticipated that a design aiding technique for product design which places most importance of such a life cycle processing will be developed.

Of course, it is known that a technique of calculating environmental impact, or environmental load concerning the entire life cycle of products includes LCA (Life Cycle Assessment) exists, as specified by ISO 140140.

This LCA calculates "environmental impact" which adversely affects the environment, such as $CO_2$ (carbon dioxide gas) or NOx (nitrogen oxide) generated in the life cycle of products (inventory analysis), and estimates environmental impact (impact analysis). Therefore, there can be supplied environmentally conscious products capable of realizing the design solution (product and product life cycle progress) of the LCA, and reducing the environmental impact if the design solution is improved based on the estimation result.

However, the conventional LCA technique averages and calculates the environmental impact of a single product. In this technique, for example, in so called multi-generation products in which one product model is manufactured as a product of a basic design being modified over multiple generations, in the case where products are recovered to remove specific parts, and the removed parts are reused in a series of the same products, it must be assumed that the supply quantity of reuse parts and the necessary quantity of parts thereof are well balanced.

Namely, in the case of considering reuse, multi-generation products in which one product model is developed through part improvement over multiple generations is most suitable. This is because new products are often composed of the same parts as the constituent parts of old products. Such product manufacturing of multi-generation products denotes that there are products, which have been used and become unnecessary, are recovered, the constituents of which become available for reuse.

In recent years, as represented by a film with lens (disposable camera), so called reuse of parts in which discarded products are recovered and dissembled by manufacturers, and the dissembled parts are reused as parts of subsequent products is requested for other manufactured articles.

In the case of manufactured articles, constituent parts are standardized, thereby enabling reuse of parts widely and commonly without being limited to multi-generation products.

In the case that the conventional LCA technique is applied for that purpose, the technique must have been utilized assuming that the supply quantity of reuse parts and the necessary quantity of the parts are well balanced.

However, the impact that the actual reuse of parts has on the environment greatly depends on the balance between a supply quantity of reuse parts and the necessary amount of parts derived from a quantity of manufactured products that incorporate the parts.

Namely, if the supply quantity of reuse parts is smaller than the necessary quantity, the number of new parts must be increased. Conversely, if the excessive amount of reuse parts are supplied, they must be discarded. Therefore, in order to precisely estimate an effect of reuse of parts on the environment, thereby achieving product manufacture with less environmental impact, the LCA must be carried out in multi-generation products considering the quantity of manufactured products.

That is, in order to precisely estimate an effect of reuse of parts on the environmental impact, the LCA must be carried out in multi-generation products considering the quantity of manufactured products.

This applies to a case in which material recycling is performed in a series of the same products.

In addition, for calculating the entire cost of the life cycle of one product, the concept of life cycle costing (LCC) is adopted.

LCC denotes the cost of the entire product life cycle from material acquisition to discarding. With respect to LCC as well, as with LCA, in order to precisely estimate the effect of reuse of parts on the environment, LCC must be applied to multi-generation products considering the quantity of manufactured products. Of course, this applies to material recycling of a series of the same products.

However, in conventional technology, conditions for reusing parts or material recycling have been met on the assumption that the supply quantity and necessary quantity of parts are balanced, thus it was impossible to precisely estimate environmental impact or the entire cost of multi-generation products.

That is, as long as products are manufactured as company activity, the manufacturing cost cannot be ignored. Thus, the manufacturing cost must be included within the range satisfied as economic activities. Therefore, companies need to manufacture products effectively in consideration of LCA or LCC. For that purpose, during development and planning of multi-generation products, it is required to enable realistic prediction while the supply quantity of reuse parts or recycle materials useable in a series of the same products is precisely reflected. That is, it is required to enable realistic prediction while events concerning reuse of parts or recycling are considered as uncertain factors.

However, the conventional technique originally assumes that the supply quantity of reuse parts and the necessary quantity of the parts are well balanced, and thus, realistic estimation cannot be performed.

Therefore, it is an object of the present invention to provide an environmental impact estimating method and apparatus and a program for, when products are manufactured considering reuse of parts or material recycling, precisely predicting and estimating the environmental impact or cost produced from a group of products in multi-generation products, making it possible to execute effective reuse of parts or effective material recycling.

BRIEF SUMMARY OF THE INVENTION

According to the first aspect of the present invention, there is provided an environmental impact estimation apparatus comprising a storage device which stores information concerning a plurality of first objects to be reused and a plurality of second objects to be recycled, and a modeling device which perform life cycle modeling to generate a life cycle model, the life cycle modeling including reading the information concerning the first objects and the second objects from the storage device, selecting some of the first objects and second objects which are diverted to at least one new product from a recovery product using the information, and combining some of the first objects and the second objects to fabricate the new product.

According to the second aspect of the present invention, there is provided a plan aiding apparatus using a recovery product, comprising: a storage device which stores information concerning reuse and recycle objects; a modeling device which performs life cycle modeling to generate a life cycle model, the life cycle modeling including reading the information concerning the objects which configure a product from the storage device, selecting some of the objects which are diverted to a new product from the recovery product using the information, and combining selected ones of the objects to fabricate the new product; and a support device which supports the plan of the new product, the support device configured to allocate combined object symbols targeted for diversion and an object symbol of the new product on a screen, and display input windows in correspondence with the object symbols and symbol to associate input product information with the object symbols and symbol, the input product information containing at least any of information on product name, previous model, product useful life, product worth life, manufacturing start time, and number of manufactured products.

According to the third aspect of the present invention, there is provided an environmental impact estimation method comprising: storing information concerning first objects to be reused and second objects to be recycled in a storage; performing life cycle modeling to generate a life cycle model, the life cycle modeling including reading information concerning the first objects and the second objects which configure a product from the storage device, selecting some of the first and second objects which are diverted to a new product from a recovery product using the information, and combining selected ones of the first and second objects to fabricate the new product; and estimating an environmental impact and cost based on the life cycle model.

According to the fourth aspect of the present invention, there is provided a plan aiding method using a recovery product, comprising: storing information concerning reuse and recycle objects in a storage; performing life cycle modeling to generate a life cycle model, the life cycle modeling including reading information concerning objects which configure a product from the storage, selecting objects to be diverted to a new product from the recovery product using the information and combining selected ones of the objects to fabricate the new product; allocating combined object symbols targeted for diversion and an object symbol of the new product on a screen; and displaying an input screen in correspondence with the object symbols and symbol to associate input product information with the object symbols and symbol, the input product information containing at least any of information on product name, previous model, product useful life, product worth life, manufacturing start time, and number of manufactured products.

According to the fifth aspect of the present invention, there is provided a predicting method for predicting product recovery comprising: inputting worth life of a product, useful life of the product, a recovery rate, a product manufacturing period, and the number of products; generating a distribution of the number of products by calculating the average number of products based on the manufacturing period and the number of products; generating a distribution of the number of recovery products by setting a recovery period corresponding to the manufacturing period and calculating the number of recovery products based on the number of products and the recovery rate; and determining a product recovery time by a shorter one of the product worth life and the product useful life.

According to the sixth aspect of the present invention, there is provided a predicting method for predicting product recovery comprising: inputting worth life of a product, useful life of the product, a recovery rate, a product manufacturing period, and the number of products; generating a triangle distribution of the number of products, the triangle distribution having a height corresponding to a peak of the number of products; generating a triangle distribution of the number of recovery products by setting a recovery period corresponding to the manufacturing period and calculating the number of recovery products based on a recovery rate corresponding to the number of products; and determining a product recovery time by a shorter one of the product worth life and the product useful life.

According to the seventh aspect of the present invention, there is provided a computer program for an environmental impact estimation stored on a computer readable medium, comprising: instruction means for instructing a computer processor to store information concerning first objects to be reused and second objects to be recycled in a storage; instruction means for instructing the computer processor to perform life cycle modeling to generate a life cycle model, the life cycle modeling including reading information concerning the first objects and the second objects which configure a product from the storage device, selecting some of the first and second objects which are diverted to a new product from a recovery product using the information and combining selected ones of the first and second objects to fabricate the new product; and instruction means for instructing the computer processor to estimate an environmental impact and cost based on the life cycle model.

BRIEF DESCRIPTION OF THE SEVERAL VIEWS OF THE DRAWING

FIG. 1 is a block diagram illustrating an environmental impact estimation apparatus in accordance with one embodiment of the present invention;

FIGS. 8A and 8B are views each illustrating an example of operation for life cycle modeling using a personal computer in the environmental impact estimation apparatus embodied in the present invention;

FIGS. 12A and 12B are views showing an example of storing the life cycle modeling result;

FIGS. 14A and 14B are views illustrating an approximation model example of a distribution of manufactured and recovered products in number for use in the environmental impact estimation apparatus embodied in the present invention;

FIGS. 17A and 17B are views each illustrating an approximation model example of distributions of manufactured and recovered products for use in the environmental impact estimation apparatus embodied in the present embodiment;

FIG. 20 is a view showing a calculation example of a reuse effect;

FIGS. 23A and 23B are views showing an example of the life cycle modeling result.

DETAILED DESCRIPTION OF THE INVENTION

Figure 2:
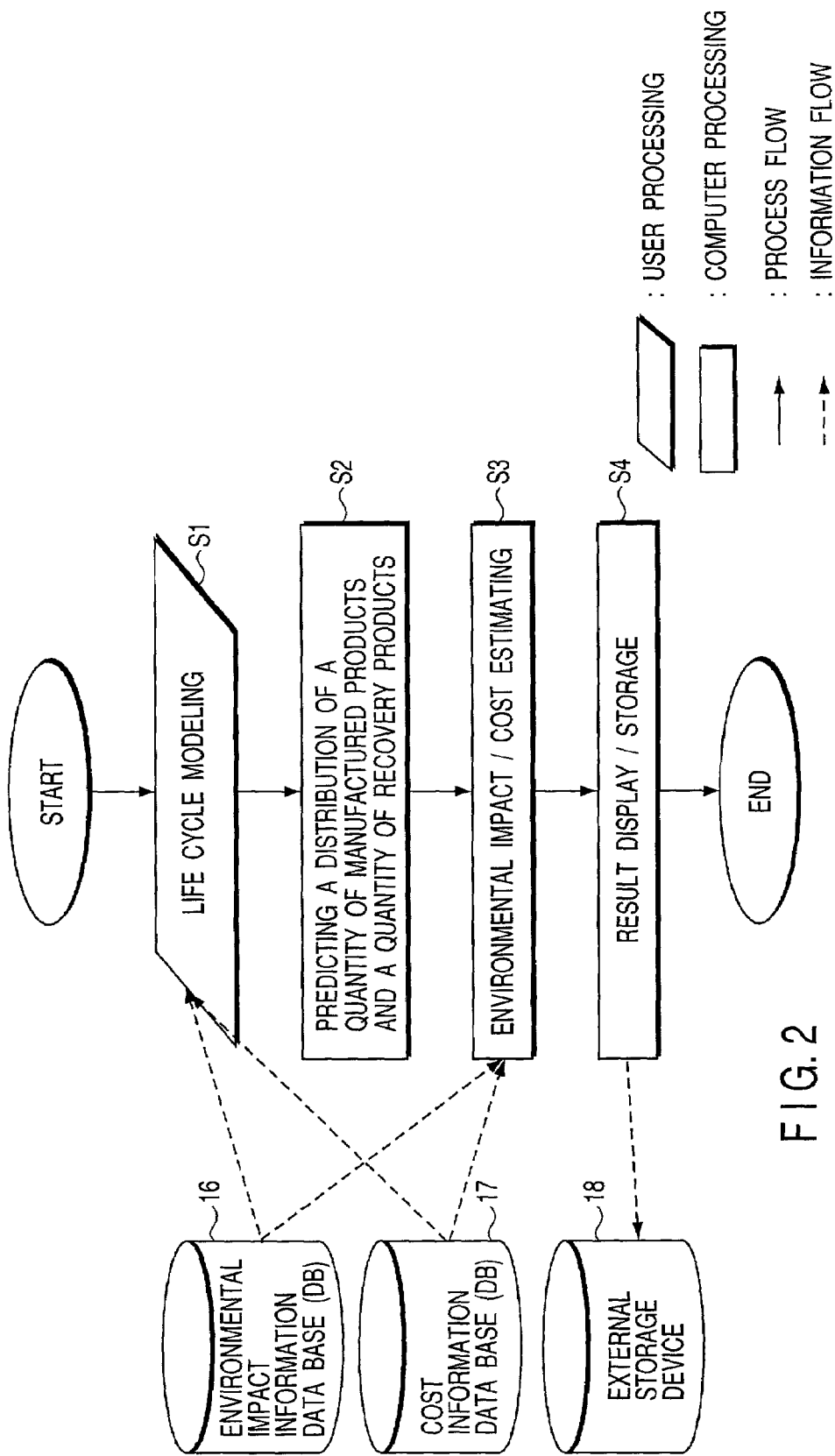
FIG. 2 is a flow chart showing procedures for carrying out environmental impact estimation and cost estimation according to another embodiment of the present invention.

The present invention is directed to a technique capable of, in the case of carrying out reuse of parts and material recycling, estimating environmental impact under the weight of multi-generation products and the actual cost to companies at the same time.

Hereinafter, embodiments of the present invention will be described with reference to the accompanying drawings.

<System Configuration>

FIG. 1 shows an environmental impact estimation apparatus in accordance with one embodiment of the present invention. Referring to the figure, the environmental impact estimation apparatus comprises a processor (CPU) 10, a product manufacturing/recovery quality predicting section 11, a life cycle/modeling section 12, an environmental impact/cost estimating section 13, a display device 14, an input/output device 15, an environmental impact information data base 16, a cost information data base 17, and an external storage device 18. The predicting section 11, life cycle/modeling section 12 and estimating section 13 correspond to programs stored in a memory 100.

The processor 10 executes a program stored in a memory 100, thereby carrying out required various control processing functions including input/output control or various computation processing functions.

The predicting section 11 predicts a product manufacturing/recovery quantity for each product that configures multi-generation products. This device processes problems such as what and how many products can be recovered in the year, what parts and how many parts can be used as parts of the next generation products or what and how many materials are available for reuse as raw materials, making it possible to predict the supply quantity. In addition, the life cycle modeling section 12 carries out life cycle modeling of multi-generation products. A detailed description of this device is given later.

The estimating section 13 calculates environmental impact and cost of the entire series of multi-generation products. The display device 14 displays the contents of the system operation or operation result such as processing result, input contents or input screen. The input/output device 15 is provided as a man-machine interface with the user (a life cycle planner). This device includes a keyboard or a pointing device provided as an input device and a printer or an audio device and the like provided as an output device.

The environmental impact information data base (DB) 16 is provided as a data base storing environmental impact information concerning the steps of material acquisition for products, manufacturing, distribution, use, recovery, discarding and environmental impact information produced during reuse of parts and material recycling. These information items are acquired by an LCA tool. The cost information data base (DB) 17 stores cost information concerning the steps of material acquisition for products, manufacturing, distribution, use, recovery, and discarding and cost information produced during reuse of parts and material recycling. These items of information are acquired by an LCC tool.

The LCA tool is intended for calculating (inventory analyzing) an "environmental impact" produced in life cycle of target products and estimating (impact analyzing) the environmental impact. By using this LCA tool, a design solution (product and product life cycle processing) is estimated, and the design solution is improved based on the estimation result, thereby making it possible develop products that reduce environmental impact. The LCC tool is a support tool that calculates the cost produced in the entire product life cycle from material acquisition for products to discarding. The external storage device 18 stores the processing or final result of estimation.

<Description of Operation>

Now, an operation of the system according to the above embodiment of the present invention will be described here.

The system is adopted to calculate and exhibit environmental impact and cost of the entire series of multi-generation products. The system is operated in accordance with the procedures S1 to S4 shown in FIG. 2. In other words, the following steps S1, S2, S3 and S4 are execute.

S1: Life cycling modeling,
S2: Predicting a supply quantity of reuse parts or recycle materials,
S3: Environmental impact/cost estimating, and
S4: Exhibiting environmental impact/cost as the obtained result In the system of the embodiment of the present invention, in carrying out reuse of parts and material recycling, the environmental impact estimation and cost estimation is carried out by means of an environmental impact estimation and cost estimation section 13. Prior to these estimations, life cycle modeling of multi-generation products is carried out (step S1 in FIG. 2). This modeling corresponds to processing of the step S1. This life cycle modeling processing is provided as definition processing for determining what products in next generation is manufactured and diverted to which products. This processing is performed by means of the life cycle modeling section 12 in the memory 100.

Figure 3:
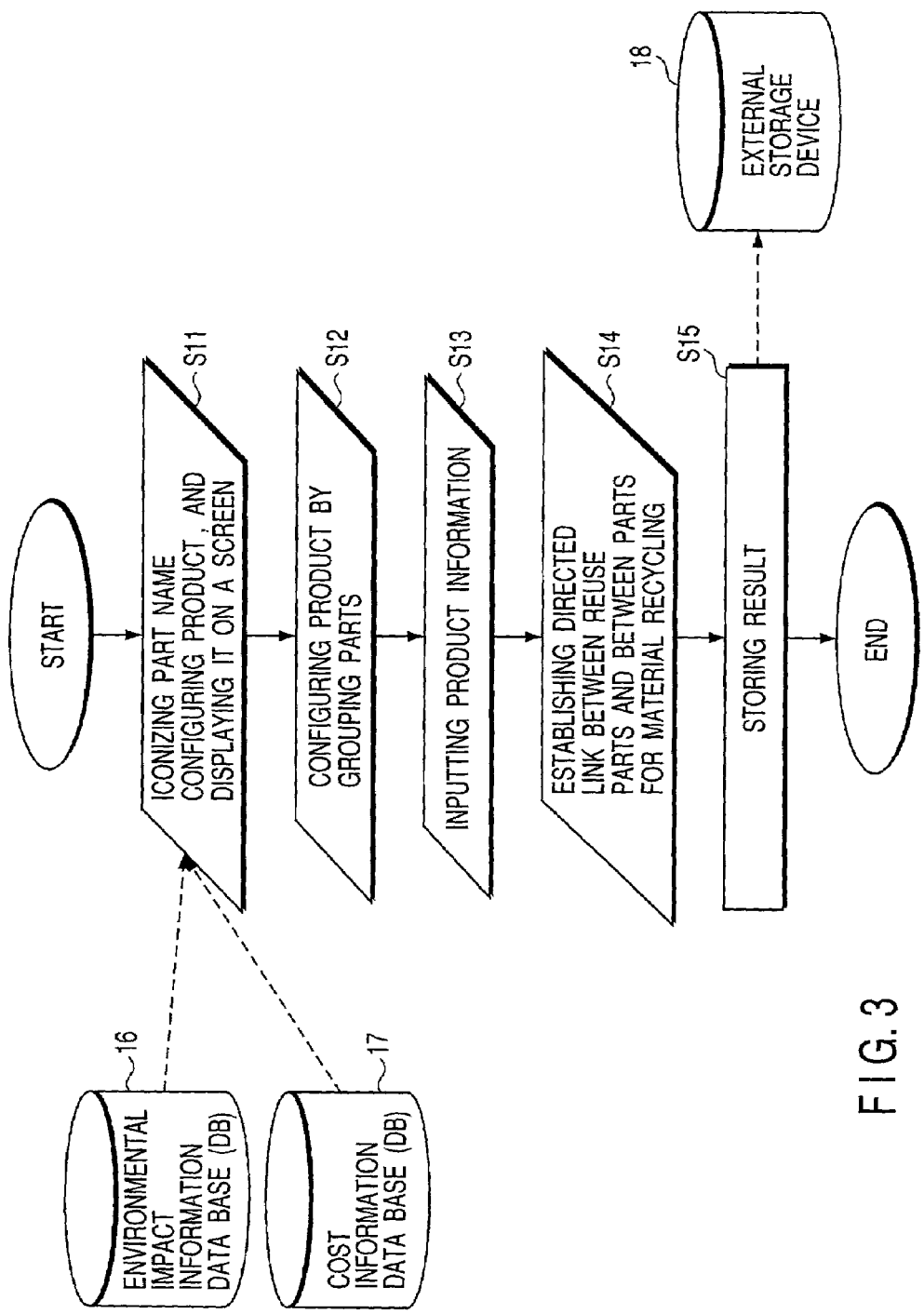
FIG. 3 is a flow chart showing procedures for carrying out life cycle modeling in the environmental impact estimation apparatus embodied in the present invention.
Figure 4A:
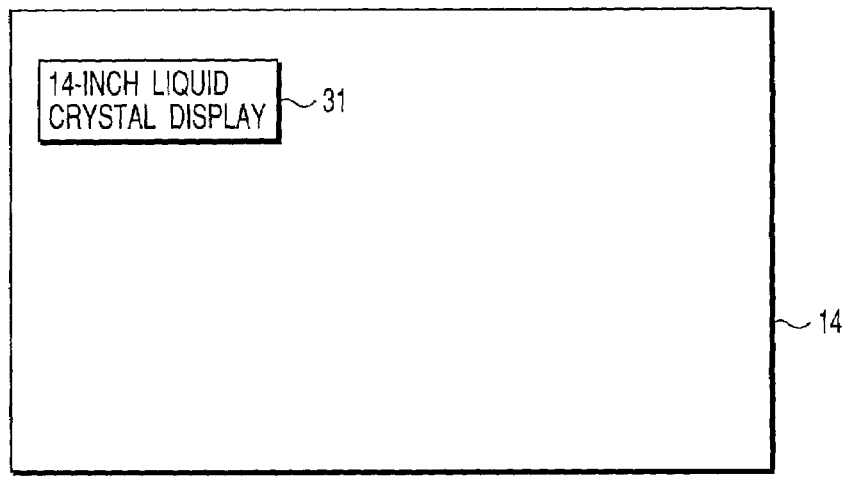
FIGS. 4A and 4B are views each illustrating an example of operation for life cycle modeling using a personal computer in the environmental impact estimation apparatus embodied in the present invention.
Figure 4B:
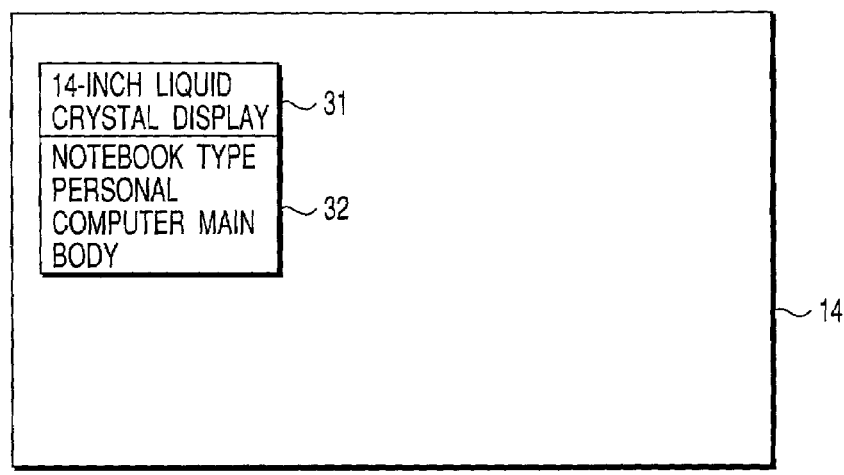

Among them, the life cycle modeling processing is performed in accordance with the procedures shown in FIG. 3. That is, a command for initiating a life cycle modeling processing function is supplied to a processor 10 by operating a keyboard or the like provided as an input/output device 15. In this manner, the processor 10 activates a life cycle modeling section 12, making life cycle modeling processing executable. Next, a user iconizes names of parts configuring products, and places them on the screen of a display device 14 (step S11 in FIG. 3). That is, the names of parts that configure products are displayed as symbols, and are pasted on the screen.

The user can specify paste positions of the names of the iconized parts arbitrarily only by moving the icon position using the mouse.

Figure 5A:
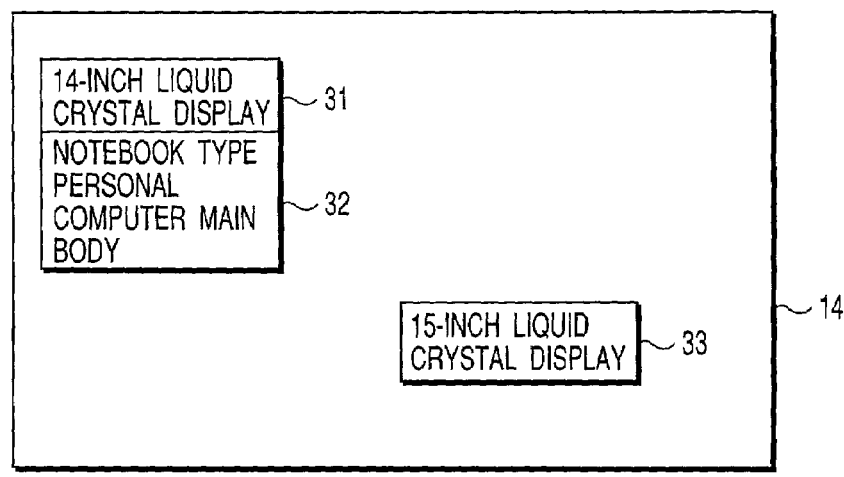
FIGS. 5A and 5B are views each illustrating an example of operation for life cycle modeling using a personal computer in the environmental impact estimation apparatus embodied in the present invention.
Figure 5B:
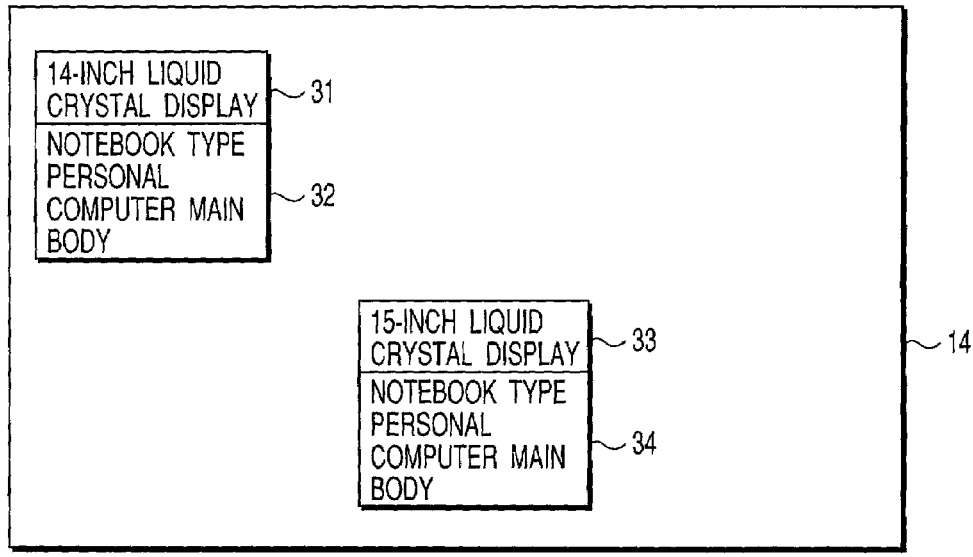

For example, the appearances of the above operation are as shown in FIG. 4A, FIG. 4B, FIG. 5A, FIG. 5B, and FIG. 6. First, the user pastes an icon 31 that iconizes part names of the next generation products targeted to be assembled by reuse parts and material recycling at a desired position of the screen (FIG. 5A). Similarly, if the next target parts are present, the associated part name is iconized, and is pasted as an icon 33 obtained by such iconization on the screen (FIG. 5B). In this example, the first pasted icon 33 is for parts of a liquid crystal display provided as a next generation product, and the second pasted icon 34 is for parts of a notebook type personal computer provided as a next generation product. These parts configure the next generation products, and thus, the user allocates both of the icons 33 and 34 to be close to each other. This allocation state is shown in FIG. 5B.

Figure 6:
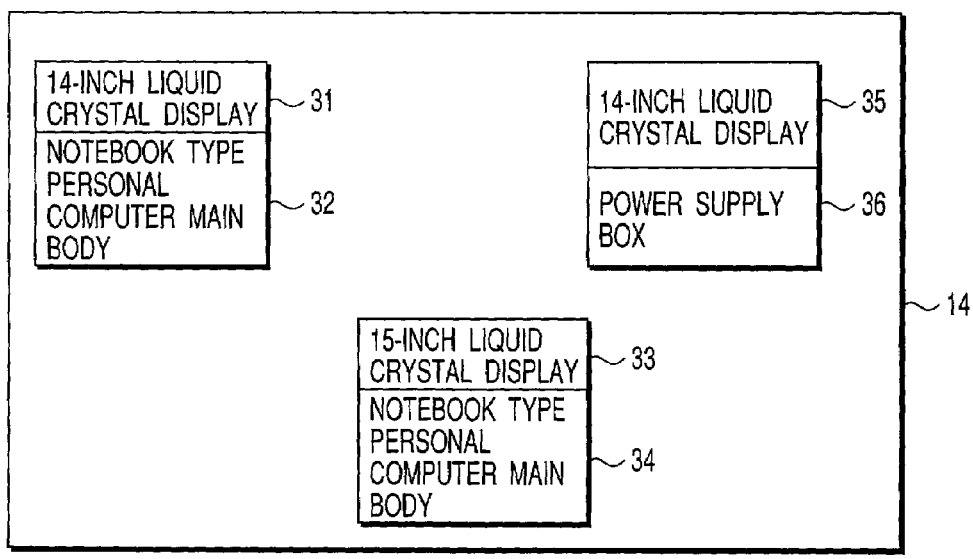
FIG. 6 is a view illustrating an example of operation for life cycle modeling using a personal computer in the environmental impact estimation apparatus embodied in the present invention.

Further, if there is another product targeted to be assembled by reuse parts and material recycling, the user iconizes the names of parts of such a product. The obtained icons 35 and 36 are pasted on a desired position of the screen (FIG. 6). In this example, the first pasted icon 35 is for parts of a liquid crystal display provided as another product, and the second pasted icon 36 is for parts of a power supply box of another product. These parts configure the products, and the user allocates both of the icons 35 and 36 to be close to each other. The allocation state is shown in FIG. 6.

Next, the user operates a pointing device such as mouse, whereby the user specifies grouped icons for part name as a unit of products by enclosing them. In this manner, products can be configured while parts are grouped (step S12 in FIG. 3). In this example, the icons 31 and 32 are grouped by being enclosed by a line, the icons 33 and 34 are grouped by being enclosed by a line, and the icons 35 and 36 are grouped by being enclosed by line. The life cycle modeling section 12 that is a program of the memory 100 recognizes the group of icons 31 and 32, the group of icons 33 ad 34, and the group of icons 35 and 36.

Next, the user inputs product information on one of the grouped products (step S13 in FIG. 3). The product information items include "product name", "name of next generation model", "product useful life", "manufacturing start time", and "total number of manufactured products" or the like.

Figure 7:
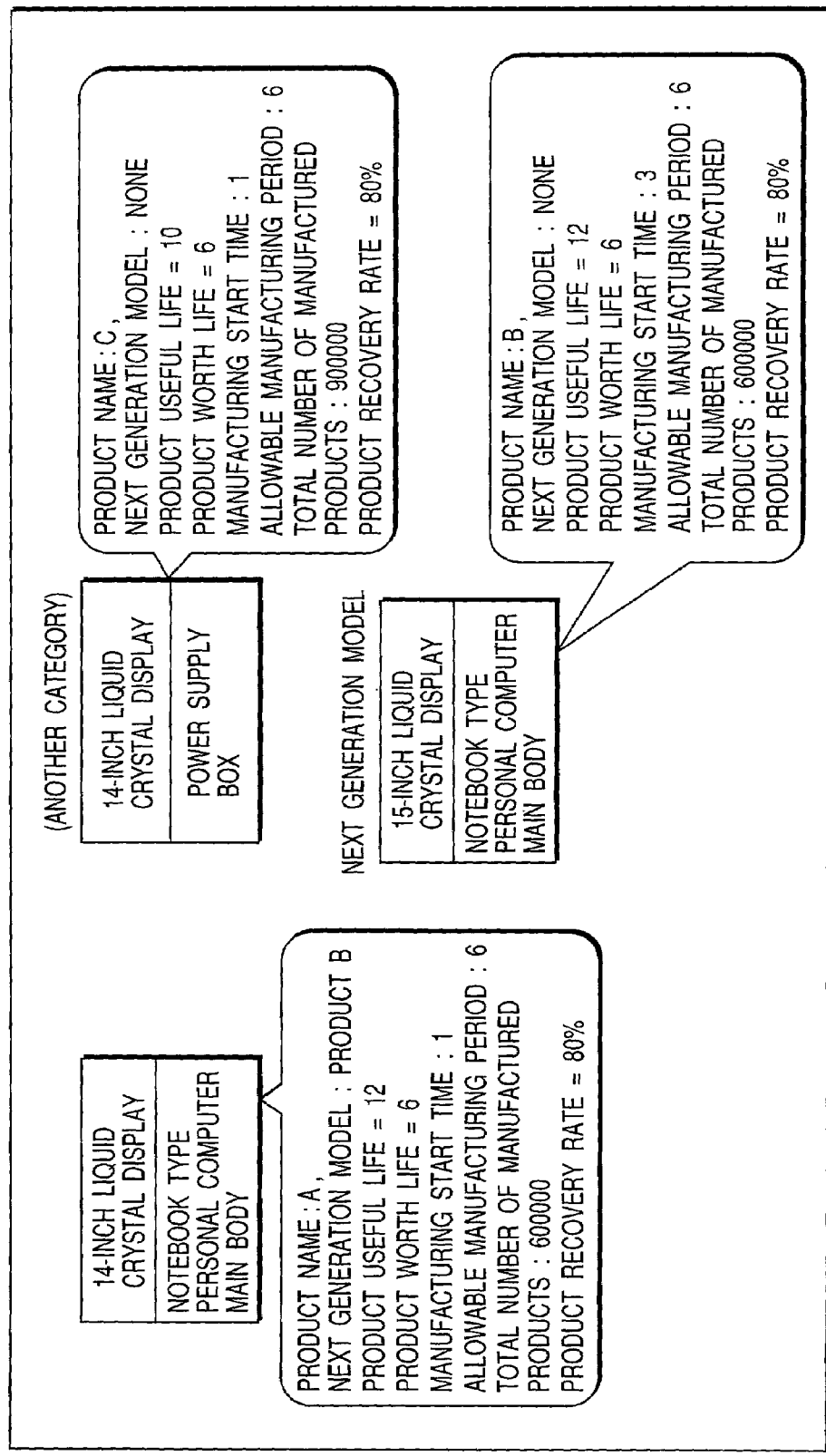
FIG. 7 is a view illustrating an example of operation for life cycle modeling using a personal computer in the environmental impact estimation apparatus embodied in the present invention.
Figure 8A:
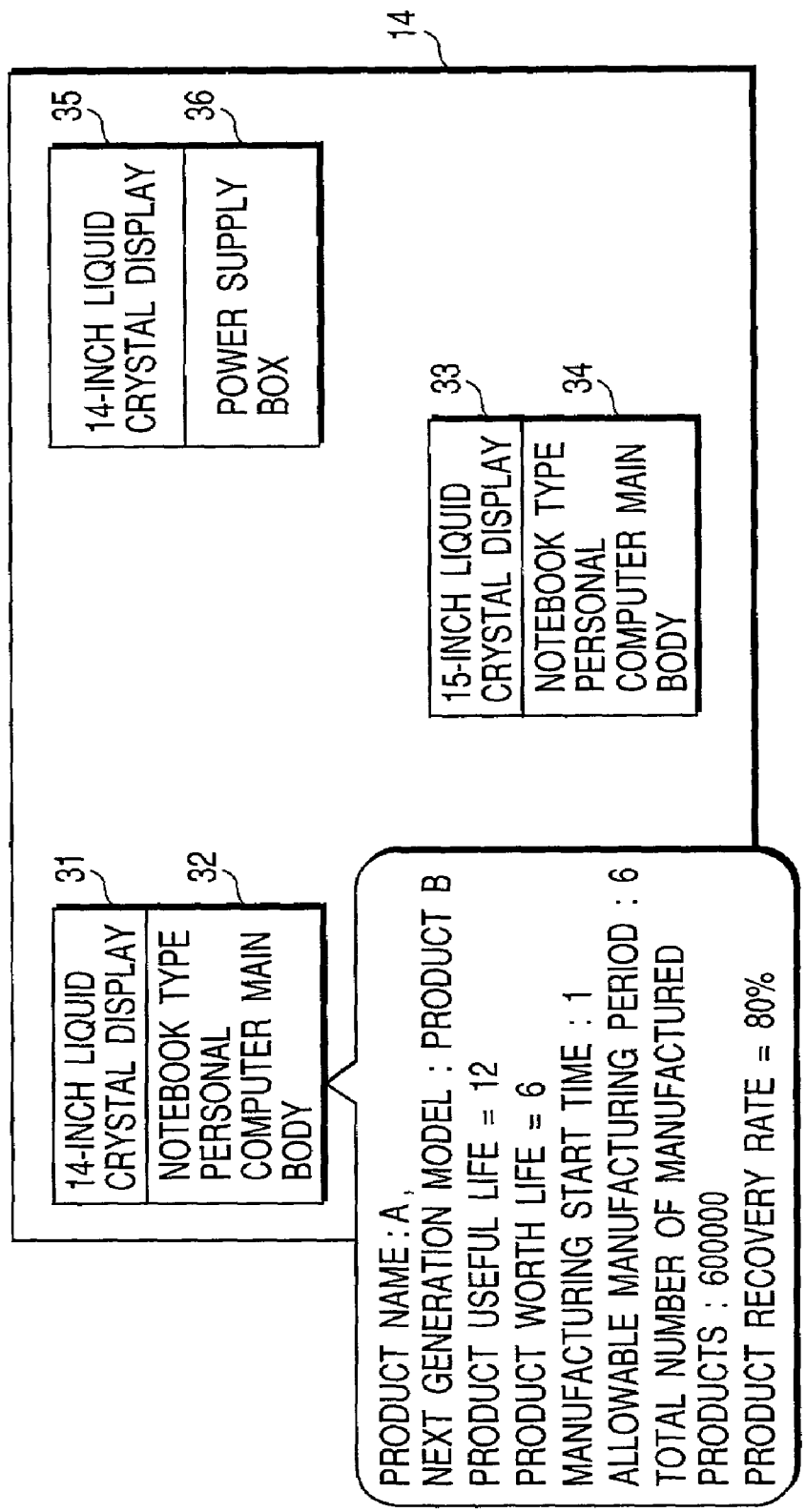
Figure 9:
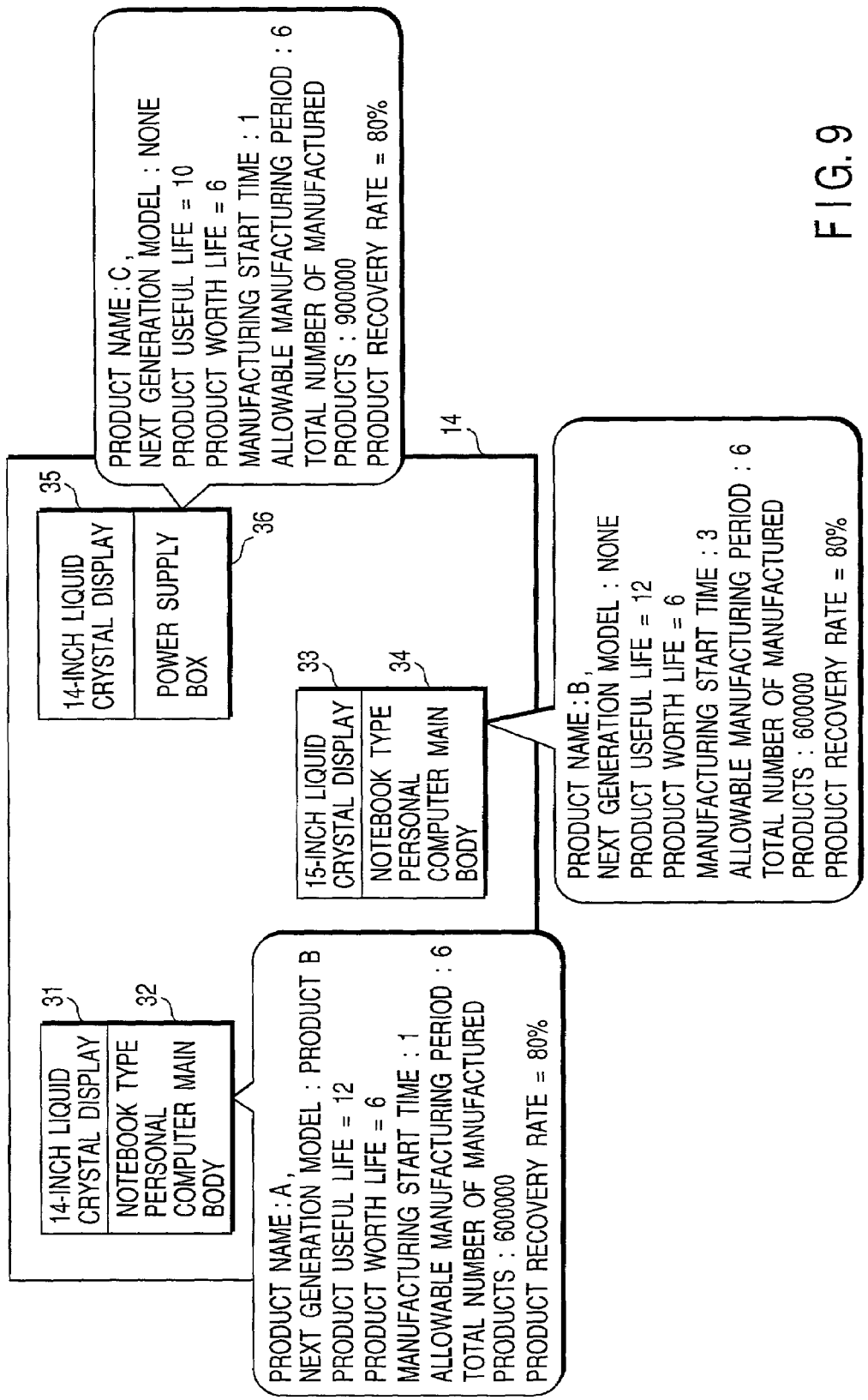
FIG. 9 is a view illustrating an example of operation for life cycle modeling using a personal computer in the environmental impact estimation apparatus embodied in the present invention.

That is, when grouping terminates, the life cycle modeling section 12 controls input windows w1, w2, and w3 for inputting product information on one of the grouped products to be displayed on the screen of the display device 14 for each group, as shown in FIG. 7 (for example, popup display). Therefore, the user inputs product information on one of the grouped products by using the above input windows w1, w2, and w3, for example, by keyboard operation. This state is shown in FIG. 8A, FIG. 8B, and FIG. 9.

When product information on one of the thus grouped products has been inputted by using the above input windows w1, w2, and w3, a directed link is then established between parts to be reused and between parts targeted for material recycling (step S14 in FIG. 3).

This is accomplished by the user operating a pointing device such as mouse i.e., thereby making a drag and drop operation for icons for the grouped part names to draw a line.

Figure 10A:
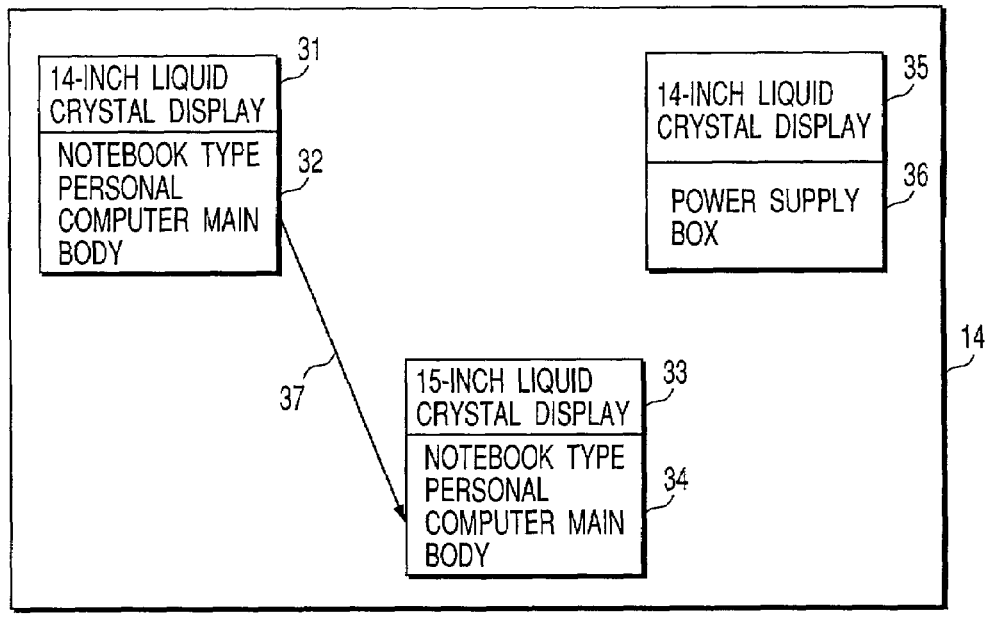
FIGS. 10A and 10B are views each illustrating an example of operation for life cycle modeling using a personal computer in the environmental impact estimation apparatus embodied in the present invention.

In this example, as shown in FIG. 10A, a mouse cursor is first placed in the icon 32. Then, a line 37 is drawn between them by a drag and drop operation for the icon 34 using the mouse. In this manner, a processor 10 displays an image as shown in FIG. 11A on the screen of the display device 14 while the line 37 with the arrow toward the icon 34 is drawn on the image. The life cycle modeling section 12 recognizes that an association with the icons 32 to 34 has been achieved.

Figure 10B:
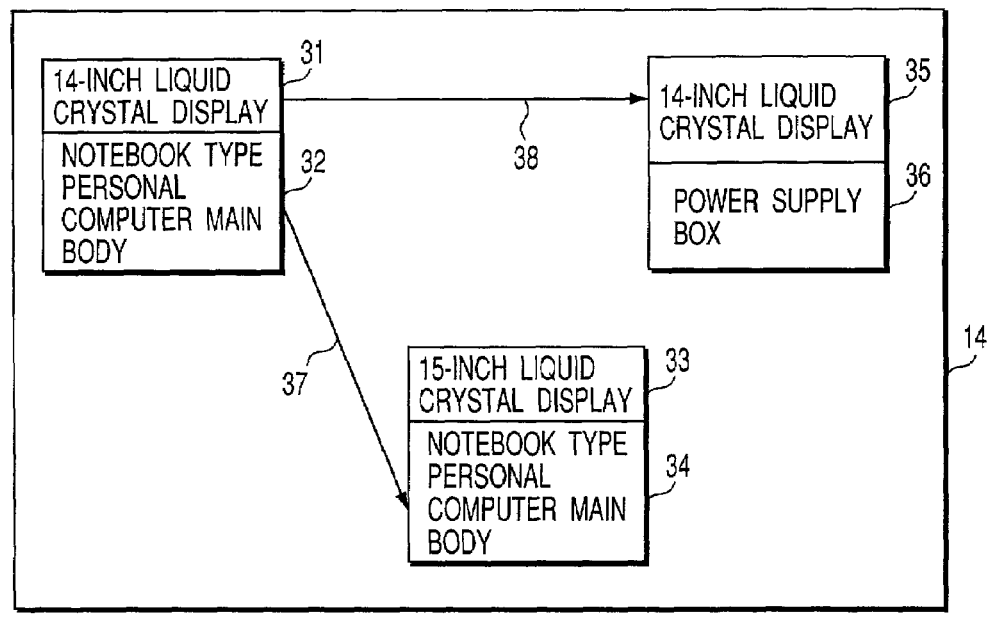

Next, the user places the mouse cursor in the icon 31, and then, draws a line 38 between them by a drag and drop operation toward the icon 35 using the mouse. In this manner, the processor 10 displays an image as shown in FIG. 10B on the screen of the display device 14 while the line 38 with the arrow from the icon 31 to the icon 35 is drawn on the image. The life cycle modeling section 12 recognize that association from the icon 31 to the icon 35 has been achieved.

Figure 11:
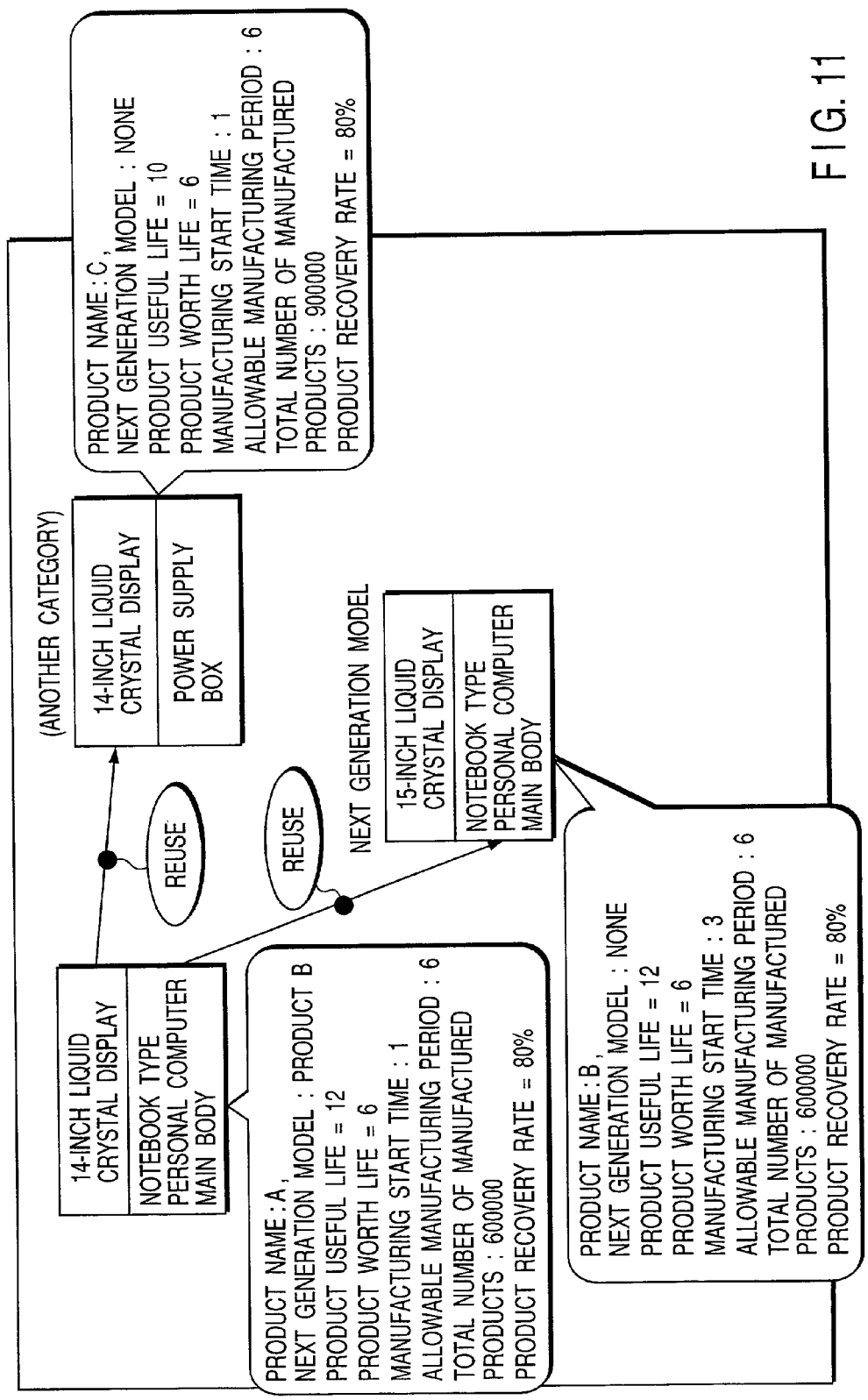
FIG. 11 is a view illustrating an example of operation for life cycle modeling using a personal computer in the environmental impact estimation apparatus embodied in the present invention.

Next, the user clicks an arbitrary point of the lines 37 and 38 with the arrow by using the mouse. Then, a screen for selection of reuse of parts or material recycling pops up. When any of these selections is made, the line is specified as association for reuse of parts or association for material recycling. In this example, assuming that reuse of parts are selected and determined, the life cycle modeling section 12 recognizes that the lines 37 and 38 has been associated with each other for the purpose of reuse of parts. Then, the processor 10 displays reuse at the positions of the lines 37 and 38 on the screen accordingly. The screen on which the above processing terminates is shown in FIG. 11.

Now, processing for establishing an effective link between these parts terminates, and life cycle modeling is completed.

In this way, in life cycle modeling processing, icons having part name iconized therein are grouped, and product information on one of these grouped products ("product name", "previous model name", "product useful life", "manufacturing start year", "an estimated total number of manufactured products" or the like) is inputted. To the "previous model name", the information on product LCA of constituent parts in that product and the LCC information are attached as related information. The life cycle modeling section 12 acquires these items of information from an environmental impact information data base 16 and a cost information data base 17.

The environment impact information data base 16 stores environmental impact information concerning the steps of material acquisition for products, manufacturing, distribution, use, recovery, and discarding that are calculated by the LCA technique conventionally used by employing the LCA tool and environmental impact information produced during reuse of parts and material recycling. The cost information data base 17 stores cost information concerning the steps of material acquisition for products, manufacturing, distribution, use, recovery, and discarding that are calculated by the LCC technique conventionally used by employing the LCC tool and cost information produced during reuse of parts and material recycling. Thus, the life cycle modeling section 12 can acquire environmental impact information (product LCA) of product simplex and cost information (LCC information in the form shown in FIGS. 12A and 12B, for example, as a result of carrying out life cycle modeling processing in accordance with the procedures shown in FIG. 3. An arterial system used herein denotes the steps of material acquisition for products to distribution in a life cycle, and a venous system used herein denotes the steps of recovery to discarding.

For example, at the step of "material acquisition for products", part name "14" LCD (14-inch liquid crystal display) weight 800 g, an amount of manufacture related $CO_2$ (an amount of carbon dioxide gas produced by the manufactured and discharged to the outside) is 3500 g, the part cost (produced cost) is 20000 Yen. At the step of "reuse", in the part name "14" LCD (14-inch liquid crystal display) an amount of recovery or inspection related $CO_2$ (an amount of carbon dioxide gas produced during inspection for recovery and reuse and discharged to the outside) is 100 g, the recovery and inspection cost (cost produced during recovery and inspection) is 500 Yen. Also, $CO_2$ per unit weight at the step of "discarding" (an amount of carbon dioxide gas produced during discarding and discharged to the outside) is 0.8 g, the cost per unit weight is 0.5 yen.

These items of information are managed by being linked (associated) with icons (part names configuring products displayed as symbols and pasted on the screen) on the screen, and the linked information is calculated so as to make data available for use.

The environmental impact information and cost information employed herein are provided as an example of the product LCA and LCC information by way of exemplifying a notebook type personal computer. These items of information are calculated by employing the conventionally available LCA technique and LCC technique. In addition, a calculation system using an industry related chart or a technique using an accumulation approach and the like is applicable.

When such life cycle modeling processing terminates, a supply quantity of reuse parts and recycle materials is then predicted in accordance with the procedures as shown in FIGS. 16A and 16B or FIGS. 18A and 18B (step S2 in FIG. 2). This supply quantity prediction processing is performed by the predicting section 11.

Figure 15A:
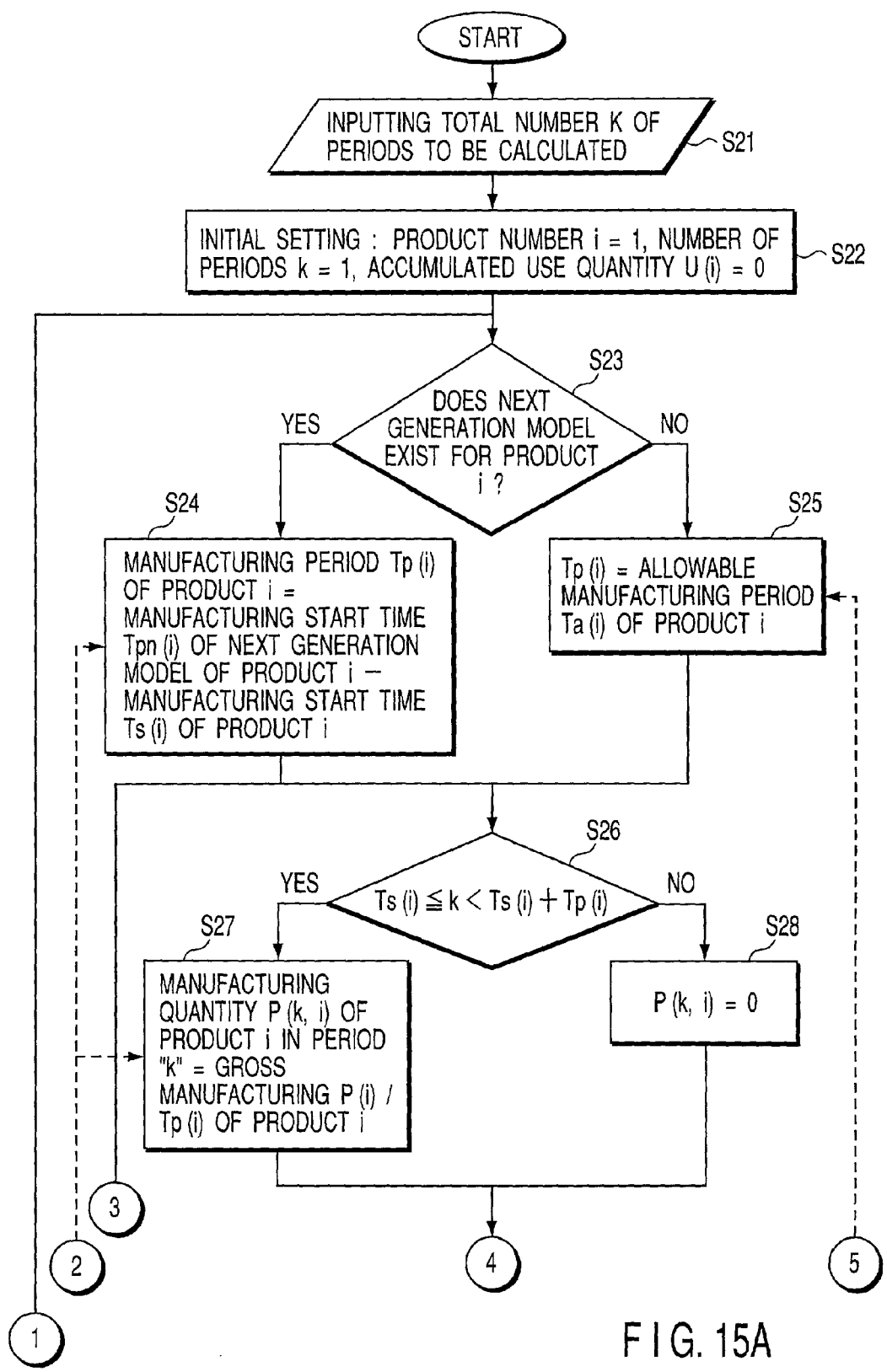
FIGS. 15A and 15B are views showing a prediction flow of a distribution of manufactured products in number and a distribution of recovered products in quantity.
Figure 15B:
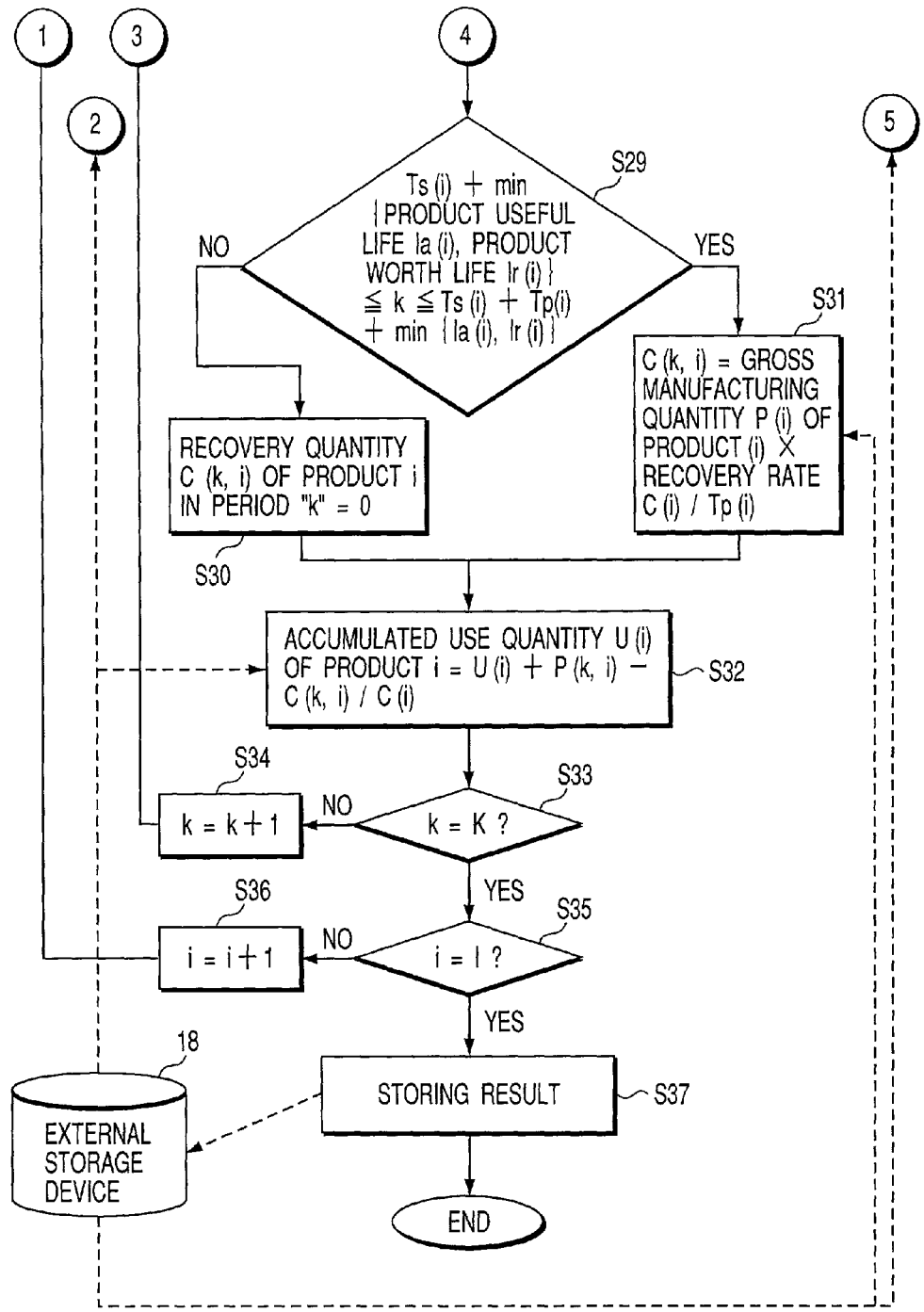

According to the procedures shown in FIGS. 15A and 15B, the total number K of periods to be calculated is input (S21). The initial values, i.e., the product number i−1, the number of periods k=1, and the accumulated use quality U(i)=0 are set (S22). It is determined whether the next generation model exists for the product i (S23). When the determination is YES, the manufacturing period Tp(i) of product i=manufacturing start time Tpn(i) of next generation model of product i−manufacturing start time Ts(i) of one product I is computed (S24). When the determination is NO, Tp(i)=allowable manufacturing period Ta(i) of product i is computed (S25).

It is determined whether Ts(i)≦k<Ts(i)+Tp(i) (S26). When the determination is YES, the manufacturing quantity P(k, i) of product i in period "k"=gross manufacturing P(i)/manufacturing period Tp(i) of product i is computed (S27). When the determination is NO, P(k,j)=0 is set (S28). Ts(i)+min{product useful life la(i), product worth life lr(i)}≦k≦Ts(i)+Tp(i)+min{la(i), lr(i)} is determined (S29). When the determination is NO, the recovery quantity C (k, i) of product i in period "k"=0 is computed (S30). When the determination is YES, the C(k, i)=gross manufacturing quantity P(i) of product (i)×recovery rate C(i)/manufacturing period Tp(i) of product is computed (S31).

Next, the accumulated use quantity U(i) of product i=U (i)+P(k, i)−C(k, i)/C(i) is computed (S32). It is determined whether k=K (S33). When the determination is NO, k=k+1 is computed and the processing returns to the step 26 (S34). When the determination is YES, it is determined whether i=I (S35). When the determination is NO, i=i+1 is calculated and the processing returns to the step S23 (S36). When the determination is YES, the result is saved (S37).

Figure 16A:
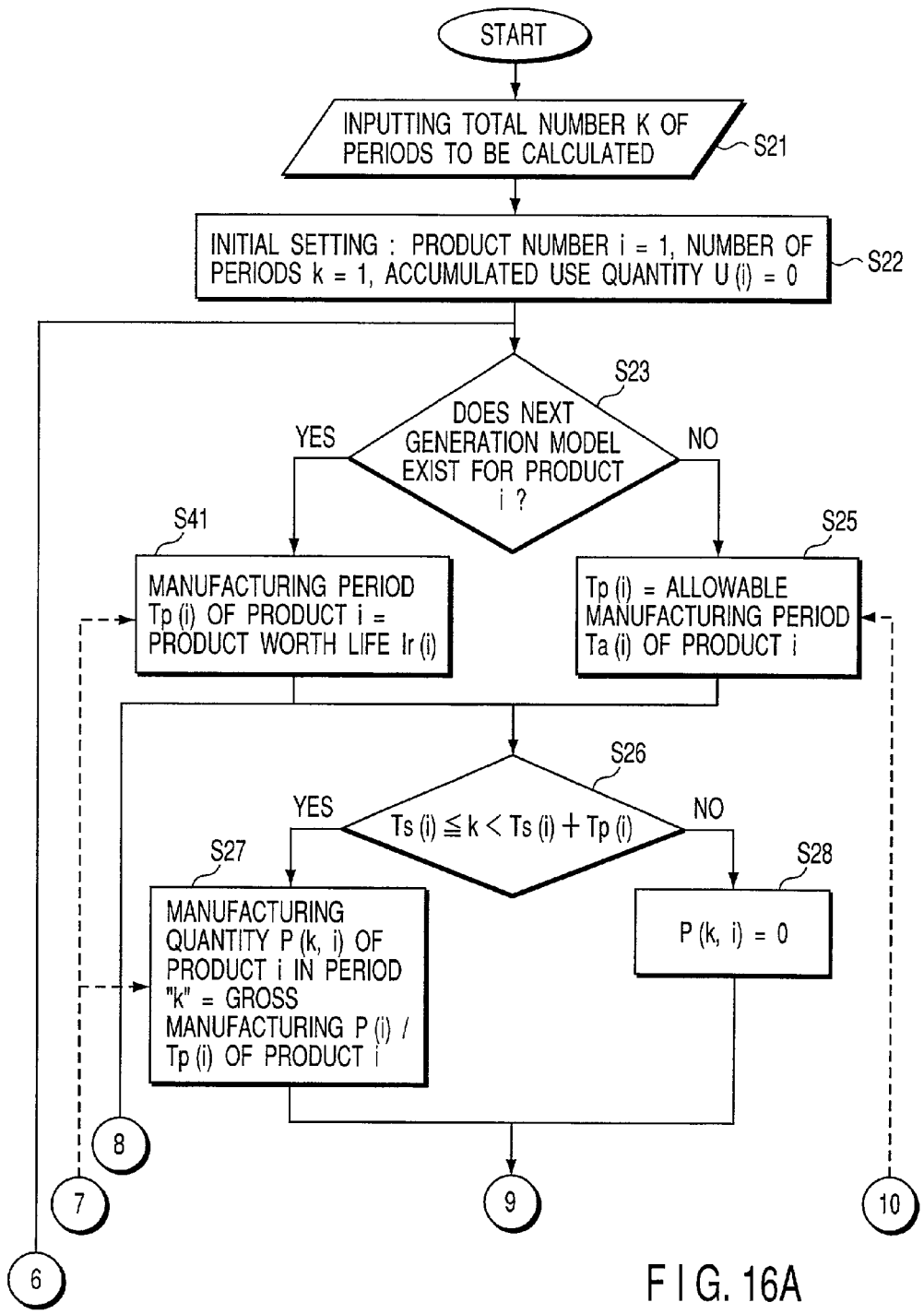
FIGS. 16A and 16B are views showing a prediction flow of a distribution of manufactured products in quantity and a distribution of recovered products in quantity.
Figure 16B:
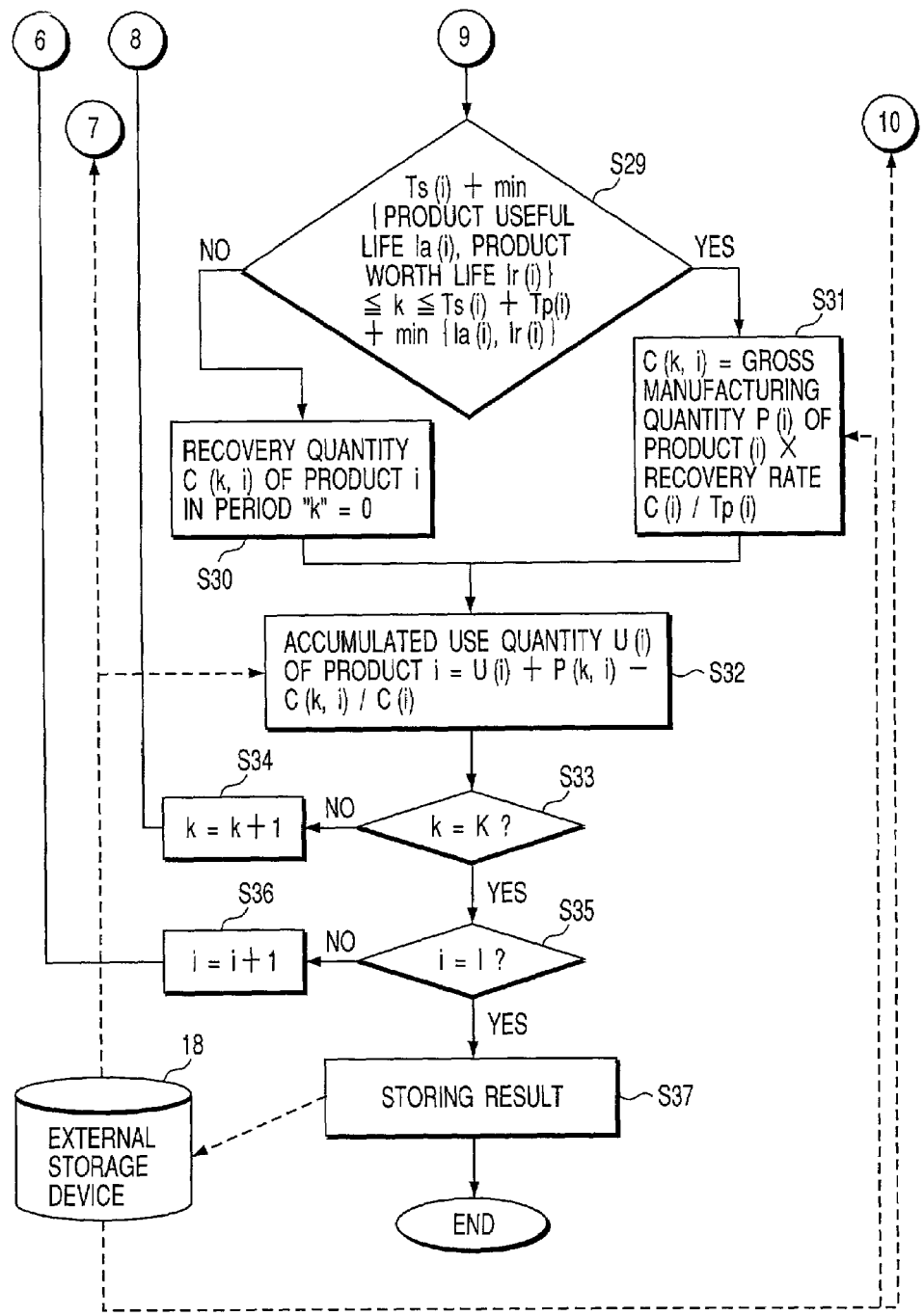

In the procedure shown in FIGS. 16A and 16B, when the determination of the step S23 is YES, the manufacturing period Tp(i) of product i=product worth life (lr(i)) is computed and the processing advances to the step S26 (S41).

Figure 18A:
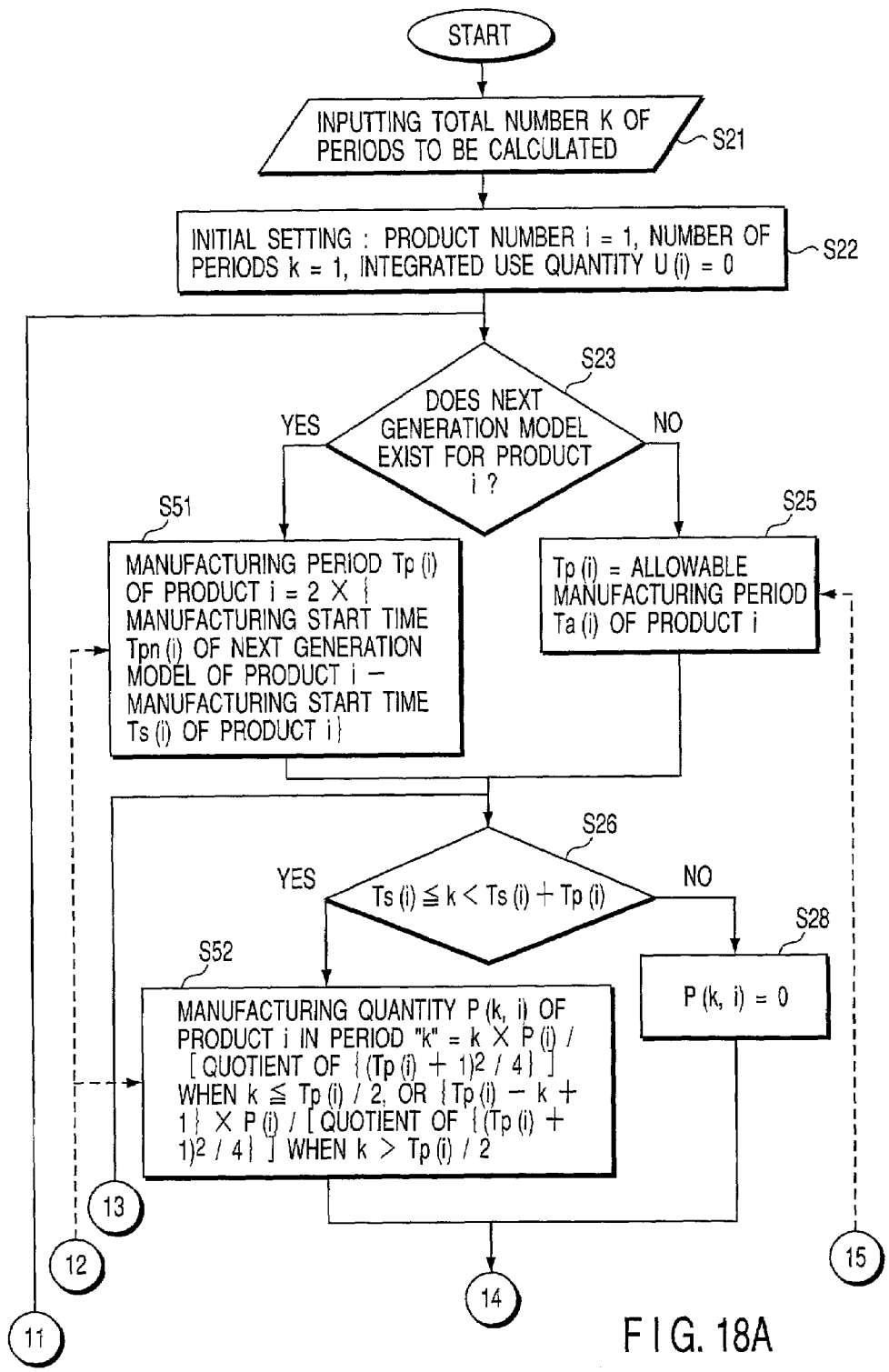
FIGS. 18A and 18B are views showing a prediction flow of a distribution of manufactured products in quantity and a distribution of recovered products in quantity.
Figure 18B:
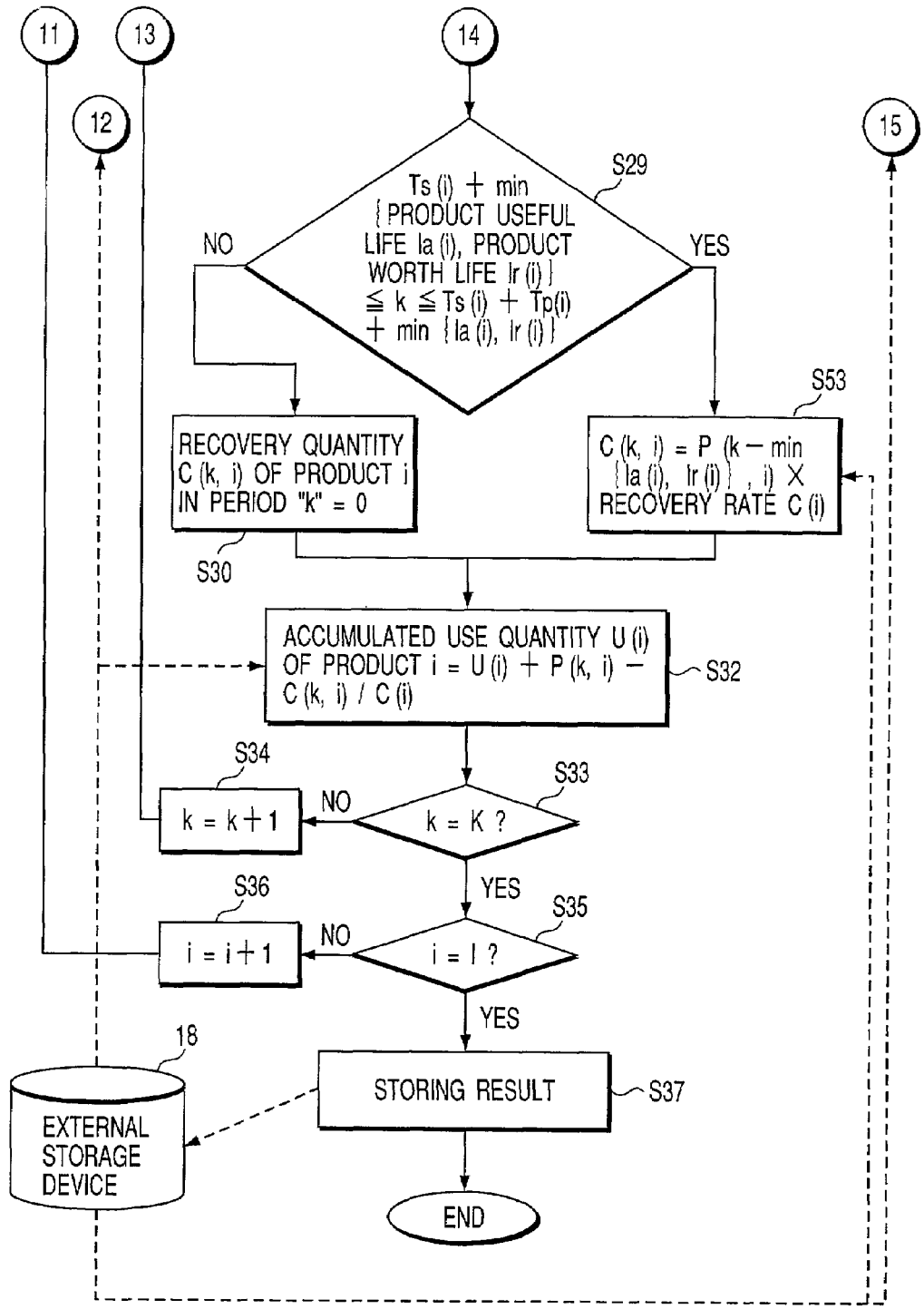

In the procedure shown in FIGS. 18A and 18B, when the determination of the step S23 is YES, the manufacturing period Tp(i) of product i=2×{manufacturing start time Tpn (i) of next generation model of product i−manufacturing start time Ts(i) of one product i} is computed (S51). When the determination of the step S26 is YES, the following computation is performed. When the determination of the step S26 is YES, the following computation is performed.

The manufacturing quantity P(k, i) of product i in period "k"=k×P(i)/[quotient of {Tp (i)+1}²/4] when k≦Tp(i)/2, or {Tp(i)−k×1}×P(i)/[quotient of {Tp(i)+1}²/4] when k>Tp(i)/2 (S52). When the determination of the step S29 is YES, C(k, i)=P(k−min{la(i),lr(i)},i)×recovery rate C(i)/Tp(i) is computed and the processing advances to the step S32.

The predicting section 11 predicts a product manufacturing/recovery quantity for each product that configures multi-generation products. This device processes problems such as what and how many products can be recovered in the year, what parts and how many parts can be used as parts of the next generation products or what and how many materials are available for reuse as raw materials, making it possible to predict the supply quantity.

Figure 19A:
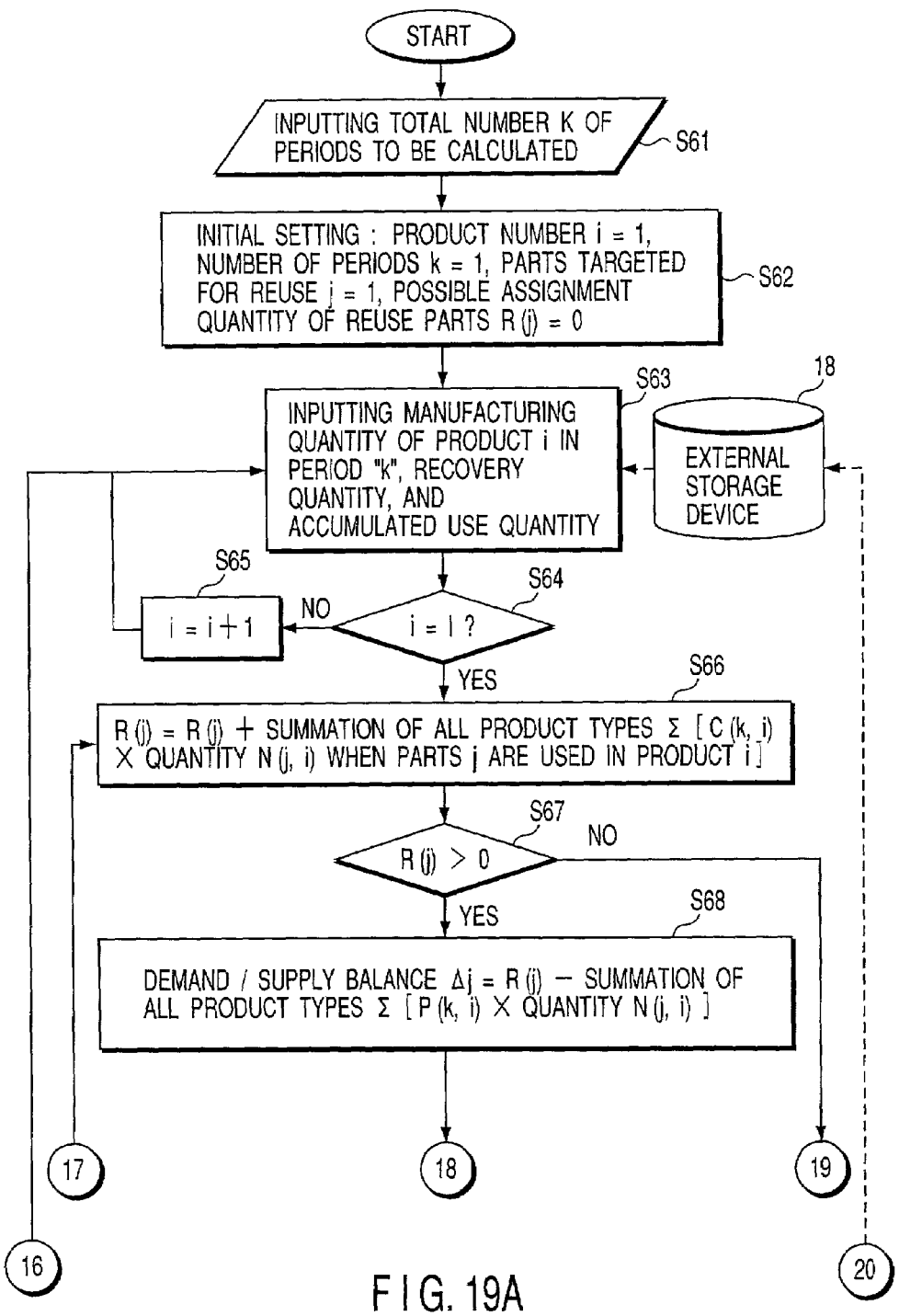
FIGS. 19A and 19B are views showing a flow of environmental impact and cost estimation.
Figure 19B:
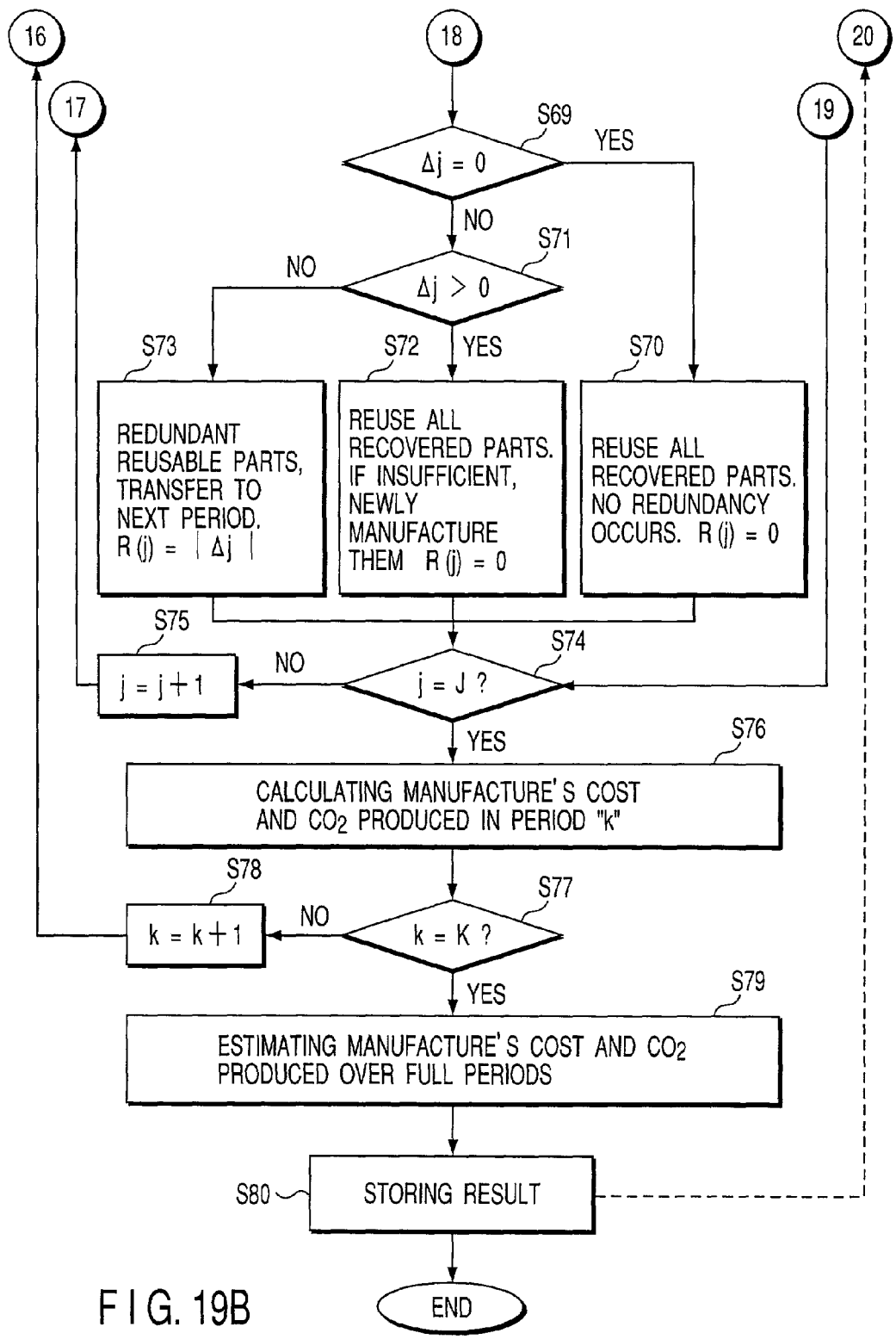

When the supply quantity of the reuse parts and recycle materials is predicted, the environmental impact and cost accumulation is performed in accordance with the procedure shown in FIGS. 19A and 19B (step S3 in FIG. 2). First, the total number K of periods to be calculated is input (S61). An initial values, i.e., the product number i=1, the number of periods k=1, the parts targeted for reuse j=1, the allowable assignment quantity of reuse parts R(j)=0 are set (S62). The manufacturing quantity of product i in period "k", recovery quantity, and accumulated use quantity are read from the external storage device 18 (S63). It is determined whether i=I (S64). When the determination is NO, i=i+1 is calculated and the processing returns to the step 63 (S65). When the determination is YES, R(j)=R(j)+summation of all product types Σ [C(k, i)×quantity N(j, i) when parts j are used in product i] is computed (S66).

Next, it is determined whether R(j)>0 (S67). When the determination is YES, demand/supply balance Δj=R (j)−summation of all product types Σ [P(k, i)×quantity N(j, i)] is computed (S68). It is determined whether Δj=0 (S69). When the determination is YES, it is determined that R(j)=0, namely, all recovered parts are reused, and no redundant recovered part exists.(S70). When the determination is NO, it is determined whether Δj>0 (S71). When the determination is YES, it is determined whether Δj>0 (S71). When the determination is YES, it is determined that R(j)=0, namely, all recovered parts are reused, and in sufficient parts are newly manufactured (S72). When the determination of the step 71, it is determined that R(j)=Δj, namely, redundancy parts of reuse are transferred to next period.(S73).

Next, it is determined whether j=J (S74). When the determination is NO, j=j+1 is calculated and the processing returns to the step S66 (S75). The determination is YES, company's cost, generated $CO_2$ in period "k" are calculated (S76). The manufacture's cost indicates material acquisition cost, manufacture cost, distribution cost, product retrieving cost, reuse cost, recycle cost, and discard cost in the product life cycle. The costs during K period within these costs are accumulated. The generated $CO_2$ indicates $CO_2$ generated in the entire of the product life cycle, that is, the stages of material acquisition, manufacturing, distribution, use, product retrieving, reuse, recycle, and discarding. The amounts of $CO_2$ during k period within the stages are accumulated.

It is determined whether k=K (S77). When the determination is NO, k=k+1 is calculated and the processing returns to the step 63 (S78). When the determination is YES, the company's cost, generated $CO_2$ are estimated over full periods (S79). The result is saved in the external storage device 18 (S80). Here, company's cost includes material cost, parts cost, manufacturing cost, distributing cost, recovery cost, inspection cost and discarding cost. And generated CO2 consists of CO2 come along with entire life cycle process.

The above processing corresponds to the procedure S3 in FIG. 2. The environmental impact/cost estimation processing is performed by means of an environmental impact/cost estimating section 13 by using information contained in an environment impact information data base 16 and a cost information data base 17. Then, the environment impact and cost of the entire series of multi-generation products are calculated.

Next, the estimation result is displayed on the display device 14 (step S4 in FIG. 2). This processing corresponds to the procedure S4. As a result, an operator can know the environmental impact and cost of the entire series of multi-generation products. In carrying out reuse and recycling, a frame of applicable products can be properly distributed, making it possible to carry out optimal reuse of parts and material recycle considering both the LCA and LCC.

A brief description of operation of the entire system according to the present invention has now been completed.

Here, what is achieved by the system according to the present invention is to achieve operation such that reuse parts or recycle materials to be diverted from used products is supplied to a subsequent manufacture without any excess or shortage, thereby making it possible to obtain the maximum effect in view of the LCA and LCC. Therefore, in the system according to the present invention, the most important factor is how precisely and simply a supply quantity of reuse parts/recycle materials can be predicted. Therefore, embodiments of the above prediction system will be described in more detail.

<Predicting Manufactured and Recovered Product Quality>

As described above, in the system according to the present invention, a supply quantity of reuse parts/recycle materials is predicted by means of the predicting section 11. In the system according to the present invention, this prediction is carried out by using a recovery distribution approximation model as shown below, whereby a supply quantity of reuse parts/recycle materials can be predicted realistically while ensuring maximally simplified processing.

In general, the effect on environment impact or cost when reuse parts and recycle materials are employed in a series of products is influenced by the number of manufactured or recovered products or the manufacturing period (market entry period). This denotes that, if an attempt is made to precisely estimate the environmental impact or cost, all the products must be handled as a group that causes environmental impact or cost in a predetermined period of time instead of environment or cost per product.

Figure 13:
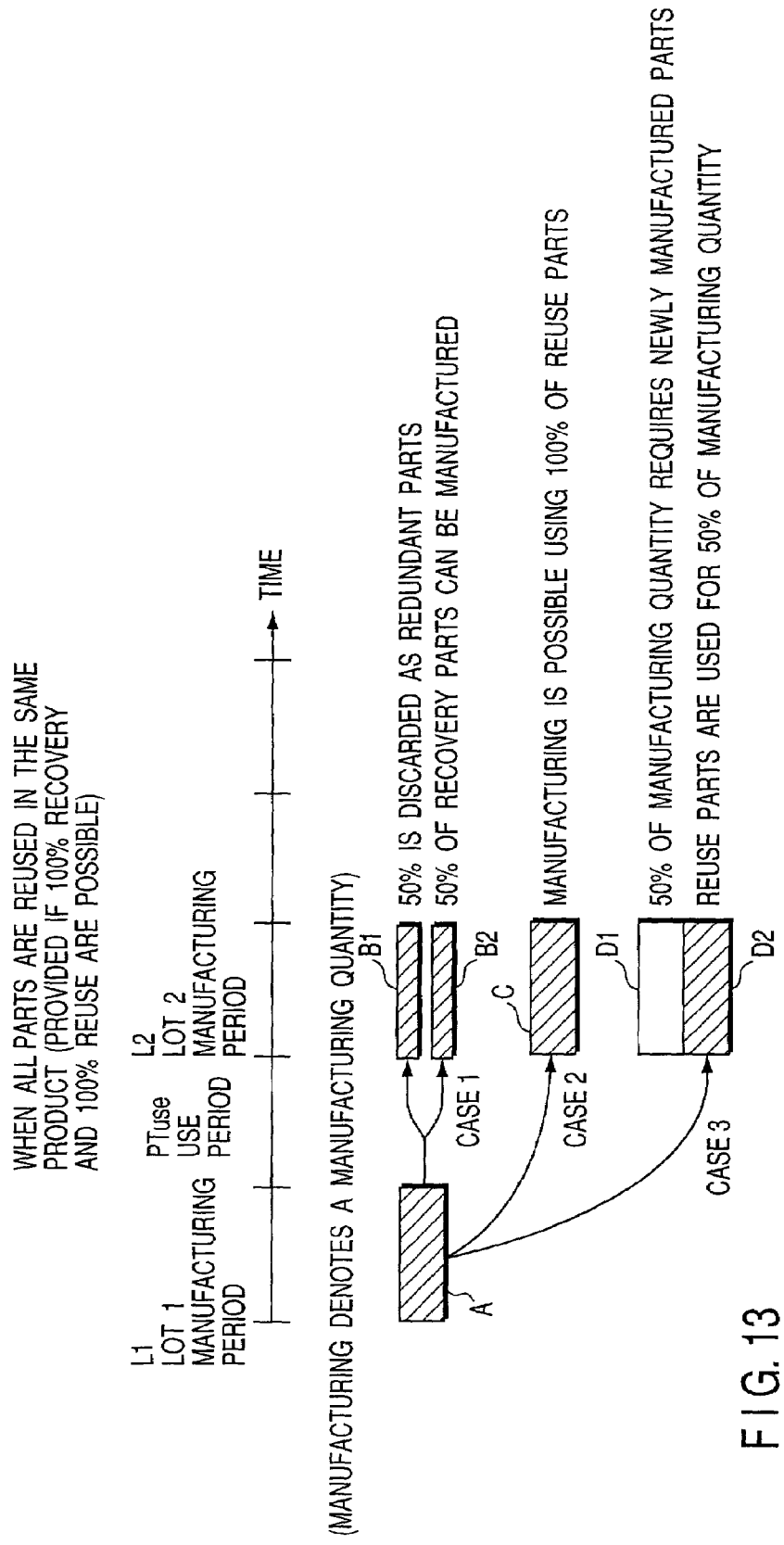
FIG. 13 is a view illustrating three modes when all parts are reused in the same products.

FIG. 13 is a view illustrating the above fact. FIG. 13 is a view showing the relationship among the manufacturing period of products of the first and next generations, the period of using the first-generation period (the period of utilizing products delivered to users), and reuse. In this example, the first-generation products are manufactured during the manufacturing period shown in manufacturing lot 1 indicated by L1, and the quantity of manufactured products is indicated by a display area for area graph A graphically represented by rectangle. The first-generation products are recovered as used products at a time when a predetermined worth life Ptuse has expired. Then, parts (reuse parts) derived from the recovered products or recovered materials are reused for product manufacture in manufacturing lot 2 assigned by sign L2 started at this time.

The modes are roughly divided into three types, "case 1", "case 2", and "case 3". Among them, the "case 1" indicates that the recovered parts are discarded as redundant parts by 50% (area graph B1), and the remaining 50% are available for reuse in "manufacturing lot 2" L2).

In addition, the "case 2" indicates that recovered parts are available for reuse in "manufacturing lot 2" L2 (area graph C).

The "case 3" indicates that recovered parts are available for reuse in "manufacturing lot 2" L2 by 50% (area graph D2), but the remaining 50% requires manufacture of new parts (area graph D1).

For the better understanding of the effect of the system according to the present invention, a description will be given, assuming a case in which products targeted to be analyzed correspond to products with a very short worth life, products can be recovered by 100% after use, and further, all the parts contained in those products are available for reuse (that is, reuse possibility=100%).

In this assumption, the effect of reuse of parts on environmental impact/cost depends on the quantity of manufactured products having reuse parts incorporated therein. Therefore, if the quantity of parts used in "manufacturing lot 1" L1 is larger than the required quantity of parts in "manufacturing lot" L2, recovered parts become redundant ("case 1"). Otherwise, a shortage of recovered parts must be used by newly manufacturing them to corrector such a shortage ("case 3").

As is evident from the foregoing, it is found that the environmental impact/cost produced in "manufacturing lot" L2 depends on the recovery quantity of products manufactured in "manufacturing lot 1" L1 and supplied in market, the quantity of manufactured products in "manufacturing lot 2" L2, the recovery period of products manufactured in "manufacturing lot 1" L1 and delivered to users, and a product manufacturing period of "manufacturing lot 2" L2.

Therefore, the precision of the estimation result is determined depending on how simply and properly the above distribution can be expressed.

In the present invention, two models, that is, approximation models 1 and 2 are provided as two expression formats.

<Approximation Model 1>

The present invention is primarily featured in that a retrieve state is modeled in a realistic state, and a supply quantity of reuse parts/recycle materials is predicted in order to carry out maximally simplified processing. The LCA and LCC is estimated based on this prediction.

In the real world (in reality), a distribution of manufactured products in number within a predetermined period is mainly determined depending on the convenience of product manufacturers, and then, the distribution of product worth life and the product recovery rate are mainly determined depending on the convenience of product users. As a result, the actual distribution of recovered products in number is determined.

As shown in FIG. 14A, the real world presumed by "approximation model 1" is described as follows. That is, in the real world, the distribution of manufactured products in number within a predetermined period is mainly determined depending on the convenience of product manufacturers, and then, the distribution of product worth life and the product recovery rate are mainly determined depending on the convenience of product users. As a result, the actual distribution of recovered products in number is determined. In this "approximation model 1", the real world is modeled as follows in order to faithfully reflect the world (refer to FIGS. 14A and 14B).

That is, assuming that the period from the start of manufacture to entry of the next generation model is defined as a manufacturing period "tp", an average number of manufactured products per unit period obtained by dividing the estimated total number of manufactured products by the manufacturing period is employed as the distribution of manufactured products in number (FIGS. 14A and 14B). In a product in which the next generation model is not set, there is employed an estimated manufacturing period, which was set at the step of life cycle modeling.

In this technique, assuming that the recovery period is the same of the manufacturing period, the total number of recovered products is calculated by employing the production recovery rate as a fixed value. Then, the thus calculated number of recovered products is divided by the recovery period, whereby an average number of recovered products per unit period is calculated.

In addition, the product worth life is defined as "min" {product worth life and product useful life}. The "min" used here denotes that the minimum period is selected as described above. That is, it denotes that the "minimum" element of two elements "product worth life" and "product useful life" is employed as a worth life. The product worth life denotes a period in which the product maintains its value in view of the product users. The product useful life denotes a period in which the product maintains its fault rate smaller than a requested fault rate. These product useful life and product worth life are individually determined by product type.

These product useful life and product worth life are individually determined by product type depending on the user of this system (a person involved in design and development of products to be estimated).

This approximation model is suitable to product category such that manufacturing is terminated in a single year, and the next generation product model is manufactured (small sized home electronics, personal computers or the like). In the graph of FIGS. 14A and 14B, the period indicated on a horizontal axis can be applied yearly or monthly.

As has been described above, a recovery quantity of used products by period can be precisely predicted. Although in this example there has been described a simple technique, there is provided an affect that the above quantity can be easily calculated as a model very close to the actual distribution of manufactured products.

In this approximation model, manufacturing period Tp is defined as the product worth life, whereby this model is applicable to a product category in which manufacturing is continued as long as a market need exists (for example, automobiles) (FIGS. 16A and 16B).

<Approximation Model 2>

This "approximation model 2" is a triangular approximation model, and this approximation method is as shown in FIGS. 17A, 17B and 18. The real world is described by referring to FIG. 17A, which is similar to that described by referring to FIG. 14A. In this "approximation model 2", an estimated total number of manufactured products is given, and a distribution of manufactured products is approximated based on an isosceles triangle distribution around a period "tpn" up to entry of the next generation model. That is, in this case, the manufacturing period Tp is defined as 2Tpn.

A triangle distribution of manufactured products in number is shifted in a time direction by a product worth life (=min{product worth life, product useful life}), and further, the height of the triangle is adjusted so that the area for the triangle is equal to the number of recovered products.

As a result, a distribution of recovered products in number that have been triangularly approximated can be obtained. In a product in which the next generation model is not set, an estimated manufacturing period set at the step of life cycle modeling is employed.

This approximation model is suitable to a product category in which manufacturing is continued for a comparatively long period. For example, this model is suitable for products in which, after entry of the next generation model such as large-sized electronic products or manufactured articles, manufacturing is continued while the quantity of manufactured products is gradually reduced. By employing this approximation mode, although the technique is simple, there is provided an effect that a quantity can be easily calculated as a model very close to the actual distribution of manufactured products in number. In the graphs of FIGS. 17A and 18B, the period indicated on a horizontal axis can be applied yearly or monthly.

As has been described above, a recovery quantity of predetermined, used products by period can be predicted while maintaining precision.

In the predicting section 11, there is applied a recovery distribution approximation model for either of the above two types of approximation model 1 and approximation model 2. Then, calculation processing is performed considering time intervals for works (such as washing or inspection) related to reuse of parts and time intervals for works related to material recycling (required days for material manufacturers), whereby a product manufacturing/recovery quantity can be realistically predicted. In addition, in the next manufacture, there can be achieved an operation such that use parts/recycle materials to be diverted from used products are supplied without excess or shortage, and the maximum advantageous effect can be achieved in view of the LCA and LCC.

It is required that the reuse parts/recycle materials to be diverted from used products is predicted before starting manufacturing of the next products so that they can be supplied without excess or shortage when manufacturing starts. For that purpose, it is required that each approximation model is optimally set so that a quantity of recovered products can be predicted precisely. At the initial stage of operation, this quantity may be deviate from reality because it is defined based on operator's experience. However, such deviation is well adjusted gradually by applying a mechanism capable of upgrading its functions. Thus, a realistically fitted model can be obtained.

As described above, the system according to the present invention comprises the following procedures S1 to S4:
S1: Life cycle modeling
S2: Predicting manufactured and recovered product quality
S3: Environmental impact/cost integrating
S4: Exhibiting environmental impact/cost as the obtained result The above life cycle modeling of S1 is directed at definition processing for determining what parts of the previous-generation products to be recovered as used are diverted to which parts of the next generation products. This processing corresponds to multi-generation products. Thus, in the present invention, in order to define the direction of flow when carrying out reuse of parts or material recycling between individual products or between products in a series, the material flow is explicitly described by the arrow. At the same time, information such as "product name", a"next generation model name", "product useful life", "product worth life", "manufacturing start time", or "a total number of manufactured products" is described with respect to each product so as to be reflected in such a definition (FIG. 11). In this manner, the source of products to be recovered, materials to be diverted to products, and products to which such materials are diverted can be defined.

After life cycle modeling has terminated, the supply quantity is predicted for reuse of parts or material recycling by using the approximation model. For clarity, the model of FIGS. 14A and 14B ("approximation model 1") is used for this prediction, and material recycling is not assumed whether it is open or closed. Therefore, after using products, there are only two selections, i.e., reuse of parts and discarding. In addition, the product recovery rate is fixed at 80%, assuming that a period related to material acquisition of products, manufacture, distribution, recovery/discarding, and reuse can be ignored. However, the product recovery rate of 80% is based on the operator's experience.

On the other hand, environmental impact and cost information on product simplex (as shown in FIG. 12) is obtained from an environmental impact information data base (DB), a cost information data base (DB), and a reuse/recycle information data base (DB). The environmental impact information used here is calculated by means of the conventional LCA technique.

In the above recovery distribution approximation mode, a supply quantity of reuse parts/recycle materials can be predicted more realistically by actually considering time intervals for works related to reuse of parts (time intervals for washing/inspection or the like) and time intervals related to material recycling (required days for material manufacturers).

Using this predicted value, the environmental impact/cost upon reuse/recycling is estimated, and the estimate value is evaluated (procedures shown in FIGS. 19A and 19B).

The result obtained by using the system according to the present invention will be described here.

FIG. 20 shows an example when environmental impact and cost are calculated in accordance with the procedures shown in FIGS. 19A and 19B by using the prediction result of a distribution of manufactured/recycled products in quantity of "approximation model 1" (FIGS. 14A, 14B and 15) with respect to the life cycle model shown in FIG. 11. In FIG. 20, a case in which parts are reused is compared with a case in which no parts are reused. The quantity of $CO_2$ produced during reuse of parts and the effect of manufacture's cost reduction are expressed by a bar graph, and are visually displayed on the screen of the display device 14. By graphically displaying the comparison result, an effect of reuse under predetermined conditions to be applied to the next generation produced can be objectively grasped.

In this way, the reuse effects in multi-generation products can be quantitatively compared with each other by using the estimation method according to the present invention. Such comparison can be performed in a completely similar manner in the case of recycling as well. In addition, a planner can refer to detail data as shown in FIGS. 12A and 12B as required.

As has been described above in detail, according to the present invention, there is provided an environmental impact estimating apparatus for carrying out at least one of reuse of product constituents or material recycling. The apparatus comprises a modeling device which carries out life cycle modeling between products targeted for reuse that is definition processing for determining what parts of the products to be recovered are diverted to which parts of the products to be newly manufactured, a predicting device which predicts a reuse product supply quantity by applying it to a model modeled by this modeling device, and an environmental impact/cost estimating device which estimates environment impact and cost to be burdened in the case of reuse from the prediction result obtained by this predicting device.

In carrying out at least one of reuse of product constituents and material recycling, there is carried out life cycle modeling between products targeted for reuse that is definition processing for determine what parts of the products to be recovered are diverted to which parts of the products to be newly manufactured. A supply quantity of reuse materials is predicted by applying it to this modeled model, and the environmental impact or cost to be burdened in the case of reuse from the obtained prediction result is estimated, thereby aiding planning for reusing constituent materials.

In this manner, in carrying out reuse of parts or material recycling, the environmental impact and cost can be precisely estimated realistically, making it possible to carry out effective reuse of parts or material recycle. In addition, according to the present invention, the environmental impact or cost of the entire series can be estimated during planning of a series of products. Thus, there can be estimated and determined the idea mode of reuse of parts or material recycling which is most suitable in minimizing the environmental cost, a cost which will rise upon the introduction of a carbon tax (carbon dioxide gas exhaust tax) discussed as one factor in determining environmental impact, for example.

Figure 21:
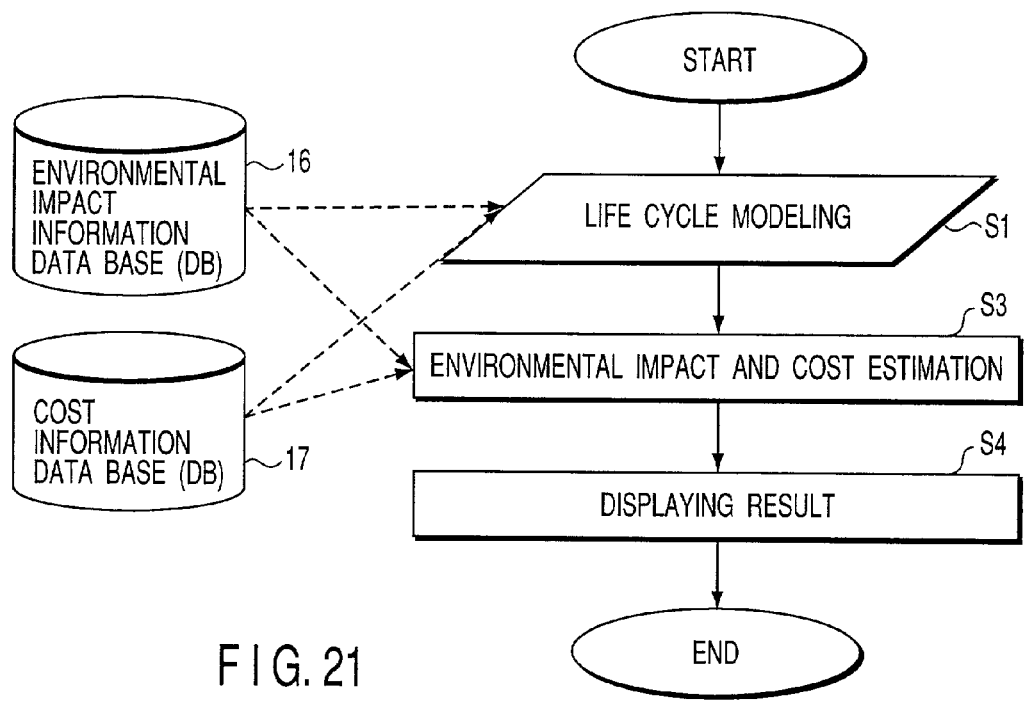
FIG. 21 is a view showing procedures for carrying out environmental impact estimation and cost estimation according to another embodiment of the present invention.
Figure 22:
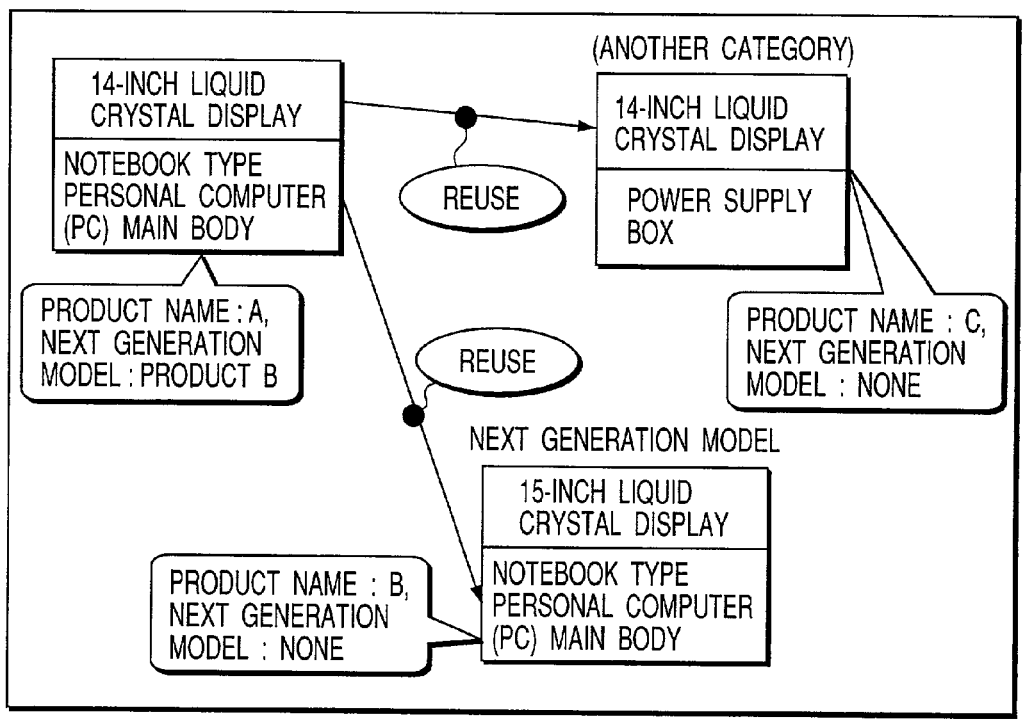
FIG. 22 is a view showing an example of a life cycle modeling screen by way of exemplifying a personal computer.

According to another embodiment of the present invention, it is possible to perform environmental impact and cost estimation (S3) after life cycle modeling (S1), as shown in FIG. 21. However, in this case, it is required for an estimator to grasp and input a product manufacturing quantity or recovery quantity and a demand/supply balance of reuse parts for every period. FIG. 22 shows an example of a life cycle modeling screen according to the present embodiment. FIGS. 23A and 23B show the results of such modeling. The present embodiment is particularly effective in the case of performing estimation for confirmation after products have already been manufactured or recovered. This is because the distribution of manufactured products or recovered products in the real world has already been grasped.

Figure 24A:
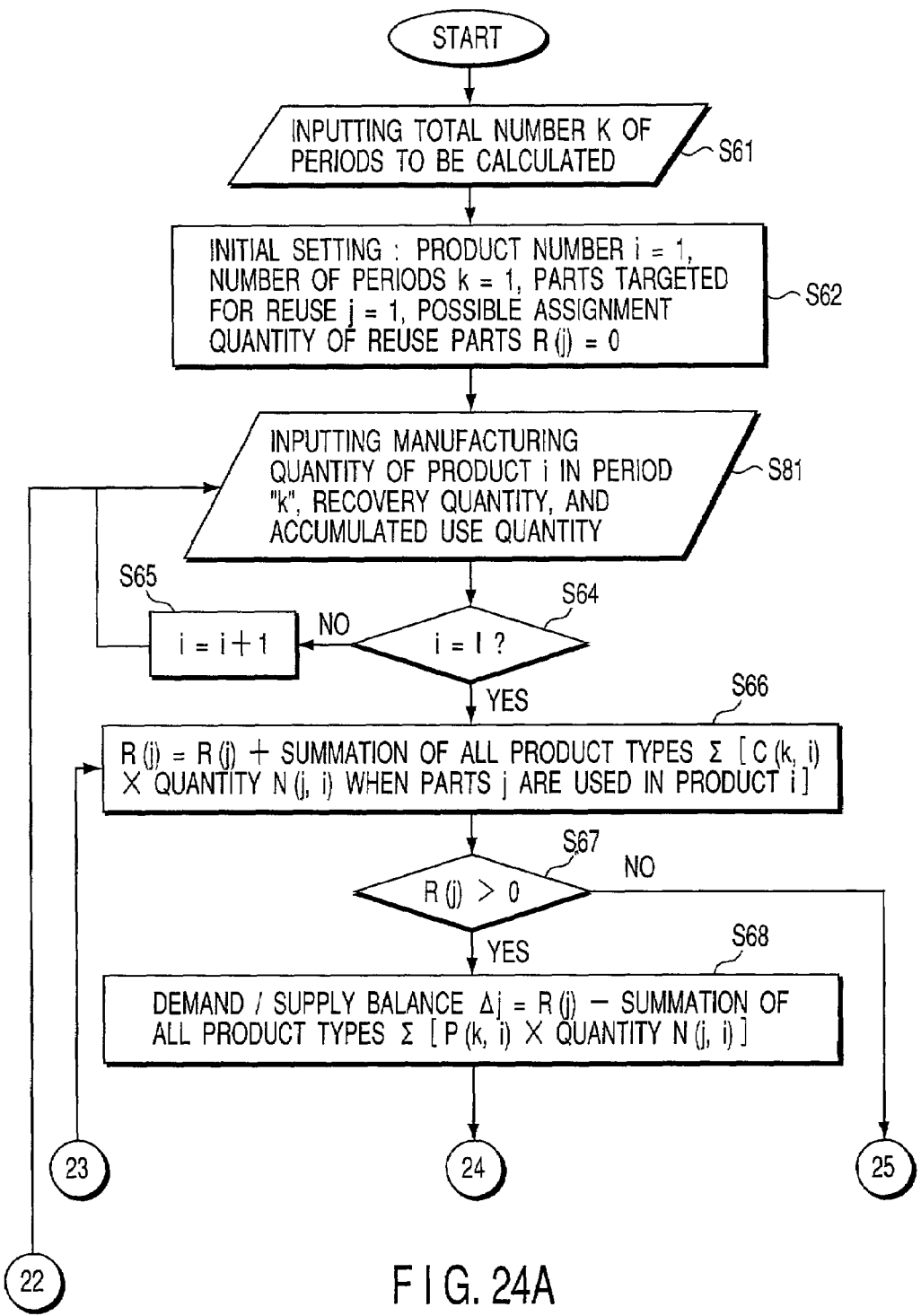
FIGS. 24A and 24B are views showing a flow of environmental impact/cost estimation.
Figure 24B:
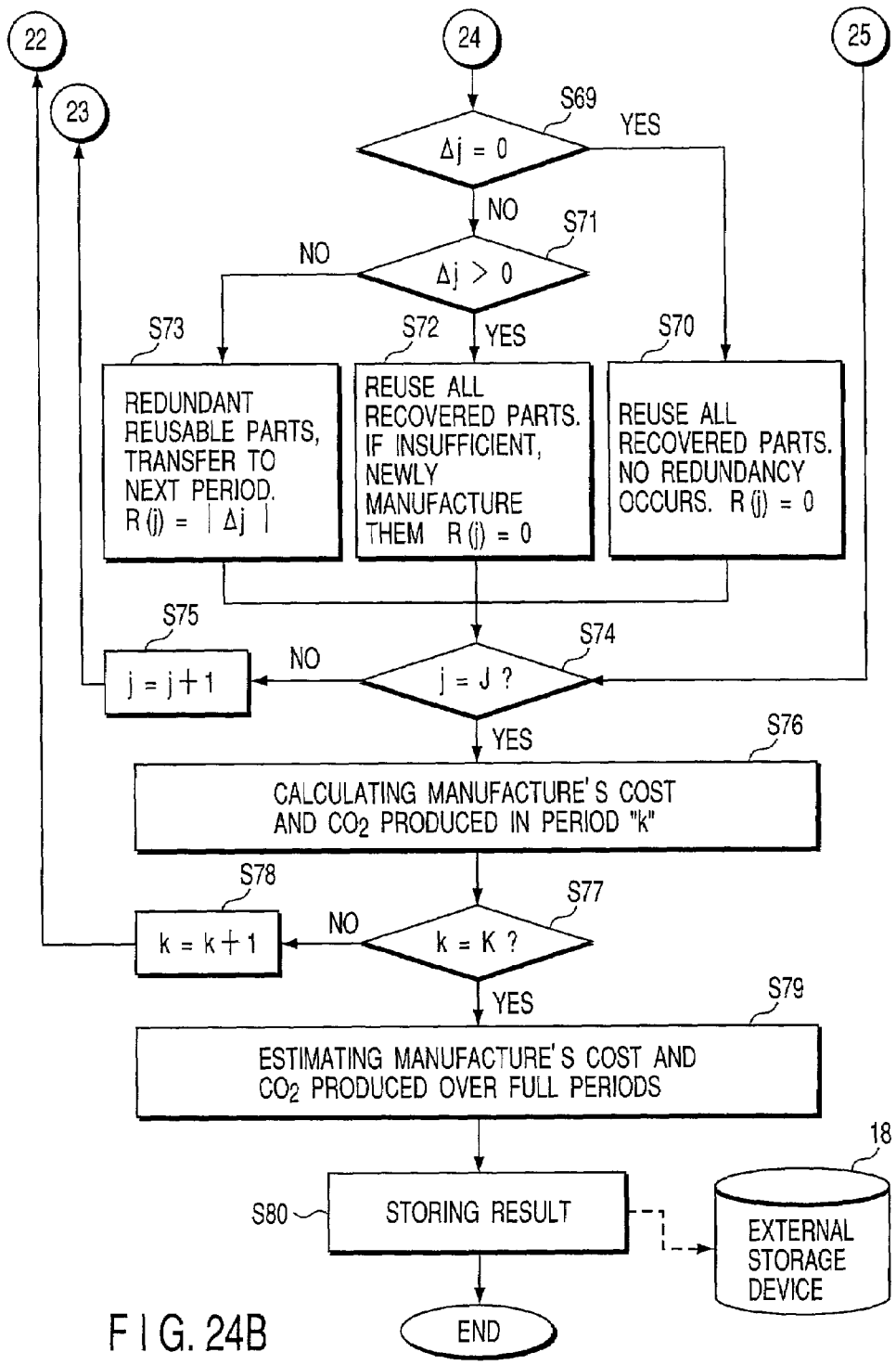

After life cycle modeling, environment impact and cost estimation is performed (FIGS. 24A and 24B), thereby evaluating the entire environmental impact and cost. In this processing, the manufacturing quantity of product i in period "k", recovery quantity, and integrated use quantity are input by the user (S81) as a processing after the step S62 in FIG. 19A. The other processings are similar to those shown in FIGS. 19A and 19B. The estimation result obtained by this embodiment can be obtained similarly to FIG. 21.

The techniques described in the embodiments of the present invention can be distributed as a program that can be executed by the computer by being stored in recording media such as magnetic disk (such as flexible disk or hard disk), optical disk (such as CD-ROM, CD-R, CD-RW, DVD, or MO), and semiconductor disk, and can be distributed through transmission via a network.

As has been described above in detail, the environmental impact and cost of multi-generation products can be realistically estimated precisely. In addition, according to the embodiments of the present invention, the environmental impact and/or cost of the entire series can be estimated during planning of a series of products. Thus, there can be estimated and determined the ideal mode of reuse of parts or material recycling which is most suitable in minimizing the environmental cost, a cost which will rise upon the introduction of a carbon tax (carbon dioxide gas exhaust tax) discussed as part of the tendency of assessment relevant to environmental impact, for example.

In carrying out at least one of reuse of product parts or material recycling, there is carried out life cycle modeling between products targeted for reuse that is definition processing to determine what parts of the products to be recovered are diverted to which parts of the new products. A supply quantity of reuse materials is predicted by applying it to this modeled model, and the environmental impact or cost to be burdened in the case of reuse from the obtained prediction result is estimated, thereby aiding planning for reusing product constituents.

In this manner, in carrying out reuse of parts or material recycling, the environmental impact and cost can be precisely estimated realistically, making it possible to carry out effective reuse of parts or material recycle. In addition, according to the present invention, the environmental impact or cost of the entire series can be estimated during planning of a series of products. Thus, there can be estimated and determined the ideal mode of reuse of parts or material recycling which is most suitable in minimizing the environmental cost, a cost which will rise upon the introduction of a carbon tax (carbon dioxide gas exhaust tax), discussed as one factor in determining environmental impact, for example.

In addition, in the above environmental impact estimation, the foregoing predicting device is configured to define a period of product use targeted for reuse by the life cycle modeling as a shorter value of the product worth life and product useful life and to approximate and predict the distribution of manufactured products in number by using the average number of manufactured products per unit period obtained by dividing an estimated total number of manufactured products by an estimated manufacturing period.

In this manner, in predicting recovered products in quantity and diverted product quantity, these products in quantities can be simply calculated as a model that is very close to an actual distribution of manufactured products. Therefore, in carrying out reuse of parts or material recycling, although comparatively simple processing is performed, the environmental impact and cost can be precisely estimated realistically, making it possible to carry out effective reuse of parts or material recycling. In addition, according to the present invention, the environmental impact and cost of the entire series can be estimated during planning of a series of products. Thus, there can be estimated and determined the ideal mode of reuse of parts or material recycling which is most suitable in minimizing the environmental cost, a cost which will rise upon the introduction of a carbon tax (carbon dioxide gas exhaust tax) discussed as one factor in determining environmental impact, for example.

In addition, in the above environmental impact estimation, the foregoing predicting device is configured to define a period of product use targeted for reuse by the life cycle modeling as a shorter value of the product worth life and product useful life and to approximate and predict the distribution of manufactured products in number by using a triangle distribution having its peak value during entry of a next generation model.

In this manner, in predicting recovered products in quantity and diverted product quantity, these products in quantities can be simply calculated as a model that is very close to an actual distribution of manufactured products in number. Therefore, in carrying out reuse of parts and material recycling, the environmental impact and cost can be precisely estimated realistically by simple processing, making it possible to carry out effective reuse of parts or material recycling. In addition, according to the present invention, the environmental impact and cost of the entire series can be estimated during planning of a series of products. Thus, there can be estimated and determined the ideality of the mode of reuse of parts or material recycling which is most suitable to minimize the environmental cost which must be burdened in introducing a carbon tax (carbon dioxide gas exhaust tax) discussed as part of the tendency of assessment relevant to environmental impact, for example.

In addition, in the above environmental impact, with respect to modeling processing of the life cycle modeling device, element symbols of recovered products linked with the element related information and its constituent parts or element symbols of products indicating a destination of material diversion are allocated on a screen, thereby supporting screen action in which an item content input screen containing at least any of product name, previous model, product useful life, product worth life, manufacturing start time, and the number of manufactured products is displayed so as to correspond to the element symbols, and the inputted information is associated with the element symbols, respectively. In this manner, modeling can be carried out by a simple operation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer-implemented predicting method for predicting product recovery comprising:

inputting worth life of a product, useful life of the product, a recovery rate, a product manufacturing period, and the number of products;

generating a triangle distribution of the number of products, the triangle distribution having a height corresponding to a peak of the number of products;

generating a triangle distribution of the number of recovery products by setting a recovery period corresponding to the manufacturing period and calculating the number of recovery products based on a recovery rate corresponding to the number of products; and determining a product recovery time by a shorter one of the product worth life and the product useful life.

2. A computer program stored on a computer readable medium, comprising:

instruction means for instructing a computer processor to input worth life of a product, useful life of the product, a recovery rate, a product manufacturing period, and the number of products;

instruction means for instructing the computer processor to generate a triangle distribution of the number of products, the triangle distribution having a height corresponding to a peak of the number of products;

instruction means for instructing the computer processor to generate a triangle distribution of the number of recovery products by setting a recovery period corresponding to the manufacturing period and calculating the number of recovery products based on a recovery rate corresponding to the number of products; and instruction means for instructing the computer processor to determine a product recovery time by a shorter one of the product worth life and the product useful life.

* * * * *